(12) United States Patent
Sidhu et al.

(10) Patent No.: US 6,366,959 B1
(45) Date of Patent: Apr. 2, 2002

(54) METHOD AND APPARATUS FOR REAL TIME COMMUNICATION SYSTEM BUFFER SIZE AND ERROR CORRECTION CODING SELECTION

(75) Inventors: Ikhlaq S. Sidhu, Vernon Hills; Guido M. Schuster, Des Plaines; James M. Kroll, Schaumburg, all of IL (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/322,836

(22) Filed: May 28, 1999

Related U.S. Application Data

(63) Continuation-in-part of application No. 09/241,689, filed on Feb. 2, 1999, which is a continuation-in-part of application No. 08/942,446, filed on Jan. 1, 1997, now Pat. No. 6,175,871.

(51) Int. Cl.[7] .............................................. G06F 13/00
(52) U.S. Cl. ......................... 709/231; 709/214; 711/148
(58) Field of Search ............................... 709/231, 214; 711/148

(56) References Cited

U.S. PATENT DOCUMENTS

| | | | | | |
|---|---|---|---|---|---|
| 5,408,606 A | * | 4/1995 | Eckart | .......................... | 345/505 |
| 5,915,104 A | * | 6/1999 | Miller | .......................... | 710/129 |
| 5,940,479 A | * | 8/1999 | Guy et al. | ............... | 379/93.01 |
| 5,946,318 A | * | 8/1999 | Post | .......................... | 370/412 |
| 6,167,050 A | * | 12/2000 | Chung | .......................... | 370/395 |
| 6,175,871 B1 | * | 1/2001 | Schuster et al. | ............ | 709/231 |
| 6,259,691 B1 | * | 7/2001 | Naudus | ....................... | 370/352 |

* cited by examiner

Primary Examiner—Kenneth R. Coulter
(74) Attorney, Agent, or Firm—McDonnell Boehnen Hulbert & Berghoff

(57) ABSTRACT

A method and apparatus for communication system buffer size and error correction coding selection. A method includes the steps of receiving a stream of data packets by a real time receiver that includes a buffer management device, a first plurality of jitter buffers, and a second plurality jitter buffers. The first and second plurality of jitter buffers are evaluated and a first and a second optimal jitter buffer is chosen. The first and the second optimal jitter buffer has an associated conditional optimal performance characteristic. The conditional characteristics are compared and a preferred buffer of the receiver is selected. The apparatus includes a receiving device including a first set of jitter buffers and a second set of jitter buffers with error coding. The first set includes a plurality of buffers and a second plurality of buffers maintained in the second set of buffers. The apparatus also includes a means for comparing the first plurality of buffers and the second plurality of buffers, a means for selecting a first optimal buffer from the first plurality of buffers, and a means for selecting a second optimal buffer from the second plurality of buffers. Either the first or the second selected optimal decoder determines the receiver buffer size and whether forward error correction is utilized.

18 Claims, 13 Drawing Sheets

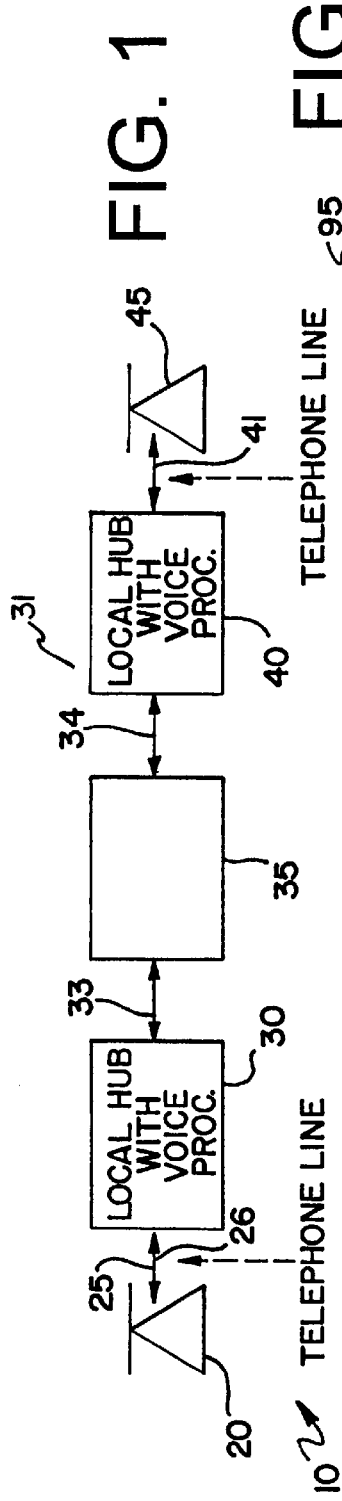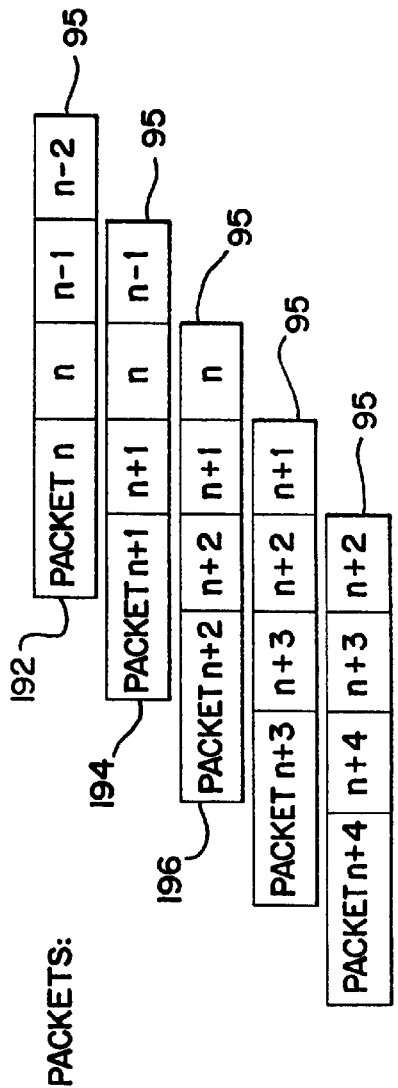

METHOD AND APPARATUS FOR REAL TIME COMMUNICATION SYSTEM BUFFER SIZE AND ERROR CORRECTION CODING SELECTION

This is a continuation-in-part application of U.S. patent application Ser. No. 08/942,446, entitled "Method and Apparatus for Real Time Communication Over Packet Networks," filed Oct. 1, 1997, now U.S. Pat. No. 6,175,871, and specifically incorporated in its entirety herein by reference. This is also a continuation-in-part application of U.S. patent application Ser. No. 09/241,689, entitled "System for Dynamic Jitter Buffer Management Based on Sychronized Clocks," filed on Feb. 2, 1999, and specifically incorporated in its entirely by reference.

COPYRIGHT NOTICE AND AUTHORIZATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

A. Field of the Invention

This invention relates to the field of telecommunications and more specifically to a method and apparatus for choosing buffer size and error correction coding for real time communication over packet networks.

B. Description of Related Art and Advantages of the Invention

Real time communications such as audio or video can be encoded using various compression techniques. The encoded information can then be placed in data packets with time and sequence information and transported via non-guaranteed Quality of Service (QoS) packet networks. Non-guaranteed packet switched networks include a Local Area Network (LAN), Internet Protocol Network, frame relay network, or an interconnected mixture of such networks such as an Internet or Intranet. One underlying problem with non-guaranteed packet networks is that transported packets are subject to varying loss and delays. Therefore, for real-time communications, a tradeoff exists among the quality of the service, the interactive delay, and the utilized bandwidth. This tradeoff is a function of the selected coding scheme, the packetization scheme, the redundancy of information packeted within the packets, the receiver buffer size, the bandwidth restrictions, and the transporting characteristics of the transporting network.

One technique for transporting real time communication between two parties over a packet switched network requires that both parties have access to multimedia computers. These computers must be coupled to the transporting network. The transporting network could be an Intranet, an Internet, wide area network (WAN), local area network (LAN) or other type of network utilizing technologies such as Asynchronous Transfer Mode (ATM), Frame Relay, Carrier Sense Multiple Access, Token Ring, or the like. As in the case for home personal computers (PCs), both parties to the communication may be connected to the network via telephone lines. These telephone lines are in communication with a local hub associated with a central office switch and Network Service provider. As used herein, the term "hub" refers to an access point of a communication infrastructure.

This communication technique however, has a number of disadvantages. For example, for a home-based PC connected to a network using an analog telephone line, the maximum bandwidth available depends on the condition of the line. Typically, this bandwidth will be no greater than approximately 3400 Hz. A known method for transmitting and receiving data at rates of up to 33.6 kbits/second over such a connection is described in Recommendation V.34, published by the International Telecommunication Union, Geneva, Switzerland.

Aside from a limited bandwidth, various delays inherent in the PC solution, such as sound card delays, modem delays and other related delays are relatively high. Consequently, the PC-based communication technique is generally unattractive for real-time communication. As used herein, "real-time communication" refers to real-time audio, video or a combination of the two.

Another typical disadvantage of PC-based communication, particularly with respect to PC-based telephone communications, is that the communicating PC receiving the call generally needs to be running at the time the call is received. This may be feasible for a corporate PC connected to an Intranet. However, such a connection may be burdensome for a home based PC since the home PC may have to tie up a phone line.

Another disadvantage is that a PC-based conversation is similar to conversing over a speakerphone. Hence, privacy of conversation may be lost. Communicating over a speakerphone may also present problems in a typical office environment having high ambient noise or having close working arrangements.

In addition, PC-based telephone systems often require powerful and complex voice encoders and therefore require a large amount of processing capability. Even if these powerful voice encoders run on a particularly powerful PC, the encoders may slow down the PC to a point where the advantage of document sharing decreases since the remaining processing power may be insufficient for a reasonable interactive conversation. Consequently, a caller may have to use less sophisticated encoders, thereby degrading the quality of the call.

A general problem encountered in packet switched networks, however, is that the network may drop or lose data packets. Packets may also be delayed during transportation from the sender to the receiver. Therefore, some of the packets at a receiving destination will be missing and others will arrive out of order.

In a packet switched network whose transporting characteristics vary relatively slowly, the immediate past transporting characteristics can be used to infer information about the immediate future transporting characteristics. The dynamic network transporting characteristics may be measured using such variables as packet loss, packet delay, packet burst loss, loss auto-correlation and delay variation.

SUMMARY OF THE INVENTION

The present invention relates to a system for real time communication buffer size and error correction coding selection. In one aspect of the present invention, a method for real time communication system buffer selection includes receiving a stream of data packets by a real time receiver. The receiver includes a management device, a first plurality of jitter buffers, and a second plurality jitter buffers. The first plurality of jitter buffers is evaluated and a first optimal jitter buffer having an associated conditional first optimal jitter buffer performance characteristic is chosen.

The second plurality of jitter buffers is evaluated and a second optimal jitter buffer is chosen. The second optimal jitter buffer has an associated conditional second optimal jitter buffer performance characteristic. The associated conditional characteristics of the first optimal jitter buffer and the second optimal jitter buffer are compared and either the first optimal jitter buffer or the second optimal jitter buffer is chosen as a preferred buffer of the receiver.

In another aspect of the present invention, a method for transporting an interactive real time media input over a packet network comprises the steps of partitioning and compressing the real time media input into a plurality of frames at a digital waveform encoder and packetizing the frames into a plurality of data packets, some of the data packets packetized having error correction coding information. The data packets are transported from the digital encoder to a receiver and unpacked into the plurality of frames. Packet information associated with the plurality of frames is arranged within each jitter buffer of a first array of jitter buffers and each jitter buffer of a second array of jitter buffers. The first array of jitter buffers and the second array of jitter buffers are evaluated according to a dynamic transporting characteristic of the network and a preferred jitter buffer is selected from either the first or the second array of jitter buffers, the preferred jitter buffer having a jitter buffer length parameter.

BRIEF DESCRIPTION OF THE DRAWINGS

FIG. 1 shows a general overview of a system for transporting a real time media input over a packet switched network and incorporating a preferred embodiment of the present invention.

FIG. 3 is block diagram of a data packet transported between the sender and the receiver shown in FIG. 2.

FIG. 4 shows an order of the redundant frames in five levels of data packets.

DETAILED DESCRIPTION OF PREFERRED EMBODIMENTS

Figure 2:
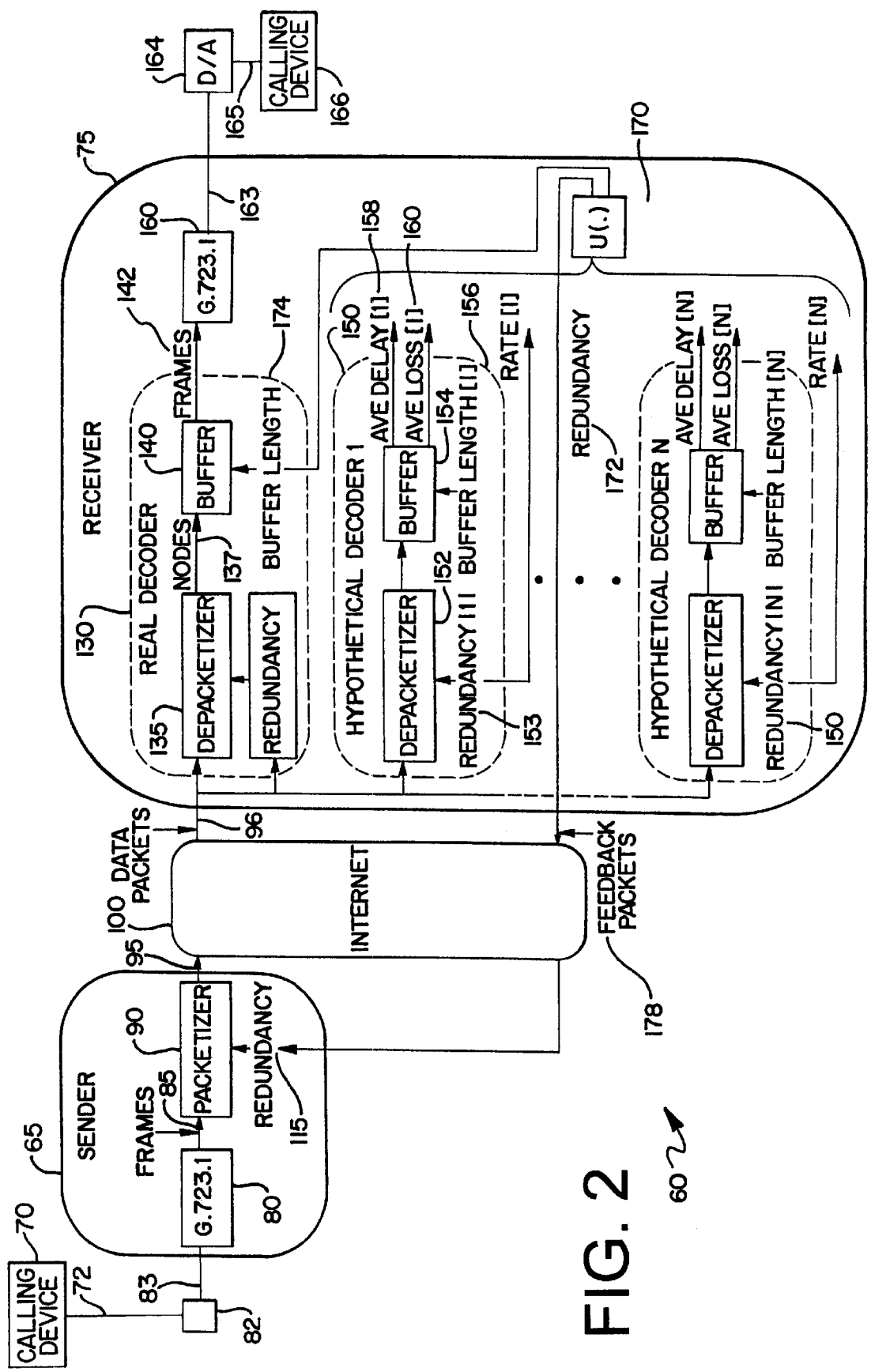
FIG. 2 illustrates a communication channel, including a sender and a receiver, in accordance with the system shown in FIG. 1.

FIG. 1 shows an overview of a system 10 for communicating a real time media input 25 and incorporating a preferred embodiment of the present invention. The system 10 includes a sending device 20, a first processing hub 30, a transporting network 35, a mapping service 31, a second processing hub 40 and a receiving device 45.

The sending device 20 is a calling device that generates the real time media input 25. Preferably, the real time media input 25 is a telephone call. Alternatively, the sending device 20 generates other types of real-time media inputs such as video, multimedia, streaming applications, or a combination thereof.

The input 25 is communicated over a telephone line 26 to the first processing hub 30. Preferably, the first hub 30 is a local hub and is commercially available from U.S. Robotics of Skokie, Ill. such as U.S. Robotics Edgeserver™ bearing part number 1098–0. The first hub 30 processes the input 25 and converts the input 25 into a form that can be transported by the transporting network 35. The first hub 30 may include an encoding device for encoding the input 25 into a digital format. The hub 30 may then compress the digital format into a plurality of frames. These frames could be packetized into a sequence of data packets 36 comprising a plurality of data packets 33. The data packets 33 are then transported by the transporting network 35 to the second processing hub 40.

The mapping service 31 maps the phone number being called to an Internet Provider (IP) address of a receiving hub. Preferably, the receiving hub is a hub closest to the party receiving the call. In the system shown in FIG. 1, the receiving hub is the second processing hub 40.

The transporting network 35 transports the data packet sequence 36 to the selected receiving hub 40. Because various packets of the sequence 36 may be dropped or lost during transportation, the first packet sequence 36 may differ from the second sequence of data packets 37. The data packets 34 comprising sequence 37 are communicated to the second calling device 45 over a telephone line 41.

In this proposed scheme, the first device 20 can place a telephone call to the second calling device 45 in the following manner. Calling device 20 activates an Internet account by calling a toll free number. The Internet account then prompts the calling device 20 for identification. An identification number, such as a phone card number or a credit card number, is entered. The calling device 20 is then provided a number of a local processing hub (i.e., the first processing hub 30) based on the caller's identification number. The first hub 30 is consequently made aware that there is a new user in its area. Once the caller has been identified, the caller 20 calls its assigned local processing hub. The hub will then recognize the caller based on the caller's identification number. One advantage of this proposed identification scheme is that it facilitates billing the caller for usage and other types of service charges.

After identifying itself to the first hub 30, the caller is asked to enter the phone number that the caller wishes to call. The mapping service 31 maps the phone number to an IP address of a sending hub closest to the caller. This phone number facilitates selecting a receiving hub as close as possible to the location of the other party to the call. The selected receiving hub then places a call to the receiving party so that the call can proceed. The caller's voice is then transported as data packets between the sending and the receiving hub.

One advantage of the system shown in FIG. 1 is that the system samples and compresses the communicated information in close proximity to the transporting network. Preferably, sampling and compressing are performed in the processing hubs 30, 40. By performing these tasks inside the processing hub as opposed to, for example, inside a PC, more computation power is available at the sending or receiving end of the call. Therefore, more complex encoders and transporting schemes can be utilized. More sophisticated billing schemes can also be implemented. For example, the price of a telephone conversation can be correlated with the quality and the delay of that particular telephone call. System 10 can also accurately measure one-way delay and can therefore compensate the transportation of data packets based on the varying transporting characteristics of the transporting network 35.

The transporting network 35 is a packet switched network and preferably the Internet. An Internet is one type of packet switched network: it is a network of networks. The Internet is divided into thousands of autonomous systems ("AS") that are individual networks controlled by an administrative agency. The range of AS sizes can vary greatly. For example, a single company with a single Ethernet local area network ("LAN") is an AS. A large AS, such as a telephone company ATM backbone spanning the breadth of the United States is also an AS. Therefore, the term Internet, as that term is used herein, is a meta-network in that it is a scheme for interconnecting different AS's such that data can be transported between AS's. Currently, the Internet spans over 140 countries and includes approximately 13 million individual hosts. The term "host," as used herein, is a computer or access point having a unique Internet Protocol (IP) address.

Alternatively, aside from the Internet, other types of AS's that can be used to transport the stream of data packets between the first and second hub 30, 40 include nationwide backbones, regional backbones, local Internet providers online services, Wide Area Networks (WANs), LANs, Intranets, university networks and corporate networks. The transporting network 35 transports the sequence of data packets from the first processing hub 30 to the second processing hub 40.

The second processing hub 40 receives the sequence of data packets 37. The sequence received 37 differs from the sequence transported 36 because of packet loss and packet delays that frequently occur in packet switched networks. The received data packets 33 are decoded by the second hub 40. The second hub first unpacks the packets and then decompresses this information. This decompressed information is then ordered within a buffer. The buffer of information is then played out and converted to an analog signal 41. The analog signal 41 is then sent over telephone line 42.

Prior to sending the analog signal 41 over the telephone line 42, the second hub 40 may call the second calling device 45. The second calling device 45 then plays out the analog input 26. The second calling device 45 can generate information and transport this information to the first calling device 20 in a similar fashion.

Preferably, the first and the second calling devices 20, 45 of system 10 shown in FIG. 1 are each associated with telephone call participants. Participants can therefore place telephone calls over a regular telephone rather than have to use a PC speakerphone system. Because telephones are generally more common than PCs, the proposed system 10 will be more available to the public. Telephones also provide a more natural user interface to those individuals who do not use or who are uncomfortable using computers.

Alternatively, the sending and receiving devices 20 and 45 are electronic communicating devices such as modems, facsimile machines, network computers, PCs, pagers, handheld communicating devices, personal digital assistants or like devices that communicate audio, video, multimedia or similar applications.

Since the first and second calling devices 20, 45 can simultaneously act as both an originator and a receiver of information, an interactive transporting environment requires bi-directional transportation of information. Such an interactive environment is shown in FIG. 1 where the first calling device 20 has been described as both the sender and the receiver of telephone calls. To provide a more detailed discussion as to how the system 10 performs interactive bi-directional communication between the first and the second processing hubs 30, 40, packet transportation from the first hub 30 acting as a sender to the second hub 40 acting as a receiver will be discussed.

FIG. 2 illustrates a communication channel 60 in accordance with the system shown in FIG. 1. The communication channel includes a sender 65 and a receiver 75. The sender 65 may, for example, be included within the first hub 30 shown in FIG. 1. The receiver 75 may be included within the second hub 40 shown in FIG. 1. It should be realized, however, that in an interactive environment where information is transported bi-directionally, a processing hub will normally include both sender 65 and receiver 75 thereby enabling the hub to receive and transmit information simultaneously.

Returning to FIG. 2, the sender 65 includes an encoder 80 coupled to a packetizer 90. A first stream of data packets 95 generated by the packetizer 90 is transported by a transporting network 35. The receiver 75 receives a stream of data packets 96. The stream of data packets 96 is supplied to a real decoder 130 and a number of computation decoders 150. The real decoder 130 includes a depacketizer 135 coupled to a buffer 140. Preferably, the depacketizer 135 operates in accordance with a first variable. Preferably, the first variable is an actual Redundancy variable 115. The size of the real decoder buffer 140 varies in accordance with a BufferLength variable 174. The buffer 140 is coupled to a decoder 162. The decoder 162 provides a digital input 163 to a digital-to-analog converter 164 (i.e., D/A converter 164). The D/A converter 164 provides signal 165 to the second calling device 166 for playout.

In an alternative embodiment, the first variable is a vector of values. These vectors may represent a plurality of variables providing further control of the communication channel. For example, such variables could be used for identifying the type of codings above being used by the sender, a redundancy parameter, and other types of control identifiers.

The computation decoders 150 are arranged in parallel to the real decoder 130. In this configuration, the computation decoders 150 and the real decoder 130 receive the stream of data packets 96. The stream 96 comprises transported data packets 97. Each computation decoder 150 includes a computation decoder depacketizer 152 and a computation decoder buffer 154.

The operation of the communication channel 60 will now be described with reference to FIG. 2. A first calling device 70 generates a real time media signal 72, preferably a telephone call. Alternatively, the signal 72 is video, multimedia, a streaming application or a combination thereof. The signal 72 is communicated to an analog-to-digital converter 82 (i.e., A/D converter 82). The A/D converter 82 converts the signal 72 to a digital signal 83. Preferably, where the signal 72 is a phone call, the digital signal 83 is a digital speech wave form.

The digital signal 83 is communicated to an encoder 80 of the sender 65. In the case of a phone call, the digital signal 83 is communicated to the encoder 80 over a telephone line. The digital input 83 (preferably in Pulse Code Modulated (PCM) form) is compressed and partitioned by encoder 80 into a sequence of frames 85. The encoder 80 encodes the digital signal 83.

Preferably, in the case where the communication channel 60 is used to communicate voice, the encoder 80 is an ITU voice encoder complying with Recommendation G.723.1. Recommendation G.723.1 describes a code excited linear predictive encoder (CELP). This recommendation G.723.1 specifies a coded representation used for compressing speech or another audio signal component of multimedia services at a low bit rate as part of the overall H.324 family of standards. Recommendation G.723.1 is entitled "DUAL RATE SPEECH ENCODER FOR MULTIMEDIA COMMUNICATIONS TRANSMITTING AT 5.3 & 6.3 KBITS/S" and is published by the Telecommunication Standardization Sector of the ITU. Recommendation G.723.1 is herein entirely incorporated by reference. Alternatively, voice encoders complying with other standards or specifications can be used.

Preferably, the digital input 83 to the encoder 80 is a digital speech waveform sampled at 8000 Hz. Each sample of the input 83 is represented by a signed 16 bit integer. The encoder 80, preferably the G.723.1 encoder, segments the input 83 into frames 85. Preferably, each frame is 30 milli-seconds (ms) in length. At the preferred sampling rate of 8000 Hz, 30 ms represents 240 samples.

The preferred G.723.1 encoder can operate at two different bit rates, a low rate of 5.3 kbits/seconds or a high rate of 6.3 kbits/seconds. In the high rate setting of 6.3 kbit/s, 480 bytes (i.e., 240 samples times 2 bytes/sample) are compressed to 24 bytes. In this high rate setting, where the input 72 is voice, the encoding results in a quality that is close to toll quality. In the low rate setting of 5.3 kbits/s, 480 bytes are compressed to 20 bytes. Therefore, between the low and high rate setting, the compression ratio varies from 20 to 24.

Preferably, the encoder 80 utilizes silence detection. The preferred G723.1 silence detection uses a special frame entitled Silence Insertion Descriptor (SID) frame. SID frame generation is described in Recommendation G723.1 which has been herein entirely incorporated by reference. During a "silence", as that term is used herein, no voice data frames are generated by the encoder 80. An SID frame defines when a silence begins. After the encoder 80 transmits an SID frame, no further voice data frames are transmitted until the current silence ends. Updated SID frames may, however, be sent. This silencing technique reduces the required overall transfer rate. Moreover, as will be discussed, silence detection allows for a dynamic adjustment of the depth of the real decoder buffer 140. The communication channel 60 can thereby compensate for varying transportation characteristics of the transport network 35.

The packetizer 90 packets the frames 85 into a plurality of data packets 92. Preferably, the packetizer 90 places a time stamp and a sequence number into each data packet 92. The time stamp identifies the time a specific data packet 92 was created. The sequence number identifies data packet ordering. Each data packet 92 includes both a current frame as well as redundant information such that a number of previously packeted frames might be reconstructed if some frames are lost during transportation. In one implementation, the number of previous frames or redundant frames is channel coded according to the actual Redundancy variable 115 of the communication channel 60. The actual Redundancy 115 is the variable that determines the number of previous frames packet into each data packet 92. The data packets 92 are ordered in a data packet sequence 95 and transported by the transporting network 35 to the receiver 75.

Each data packet time stamp enables the receiver 75 to evaluate certain dynamic transporting characteristics of the transporting network 35. These transporting characteristics determine how the packetizer 90 packetizes the frames 85 and how the receiver 75 unpacks these frames. These varying transporting characteristics can include such characteristics as the standard deviation of one-way delay or the round trip time for each transported data packet 97. The round trip time is calculated by transporting a copy of the time stamp back to the sender 65 and comparing the received time with the timestamp value. The standard deviation of one-way delay is typically approximated by averaging the absolute value of differences between time stamp values and received times for each packet 97. Alternatively, if real time protocol (RTP) is used, data packet sequence numbers and time stamps are placed within the RTP header. The sequence numbers and timestamps do not, therefore, need to be reproduced in the data packet payload. Other transport protocols that contain timestamps and sequence number information can also be used in place of the RTP protocol.

The receiver 75 receives a sequence of data packets 96. This sequence of data packets 96 may vary from the sequence of data packets 95 originally communicated to the transporting network 35. The variance between the two data packet sequences 95, 96 is a function of varying transporting characteristics such as packet loss and packet transport times.

Because the preferred transporting network 35 is a non-guaranteed packet switched network, the receiver 75 receives packets out of order vis-a-vis other data packets comprising the originally transported packet sequence 97. To combat this occurrence, as previously mentioned, the packetizer 90 adds sequence numbers to the frames 85 before the frames are packetized. As will be discussed with reference to the real decoders 130, the receiver 75 has a real decoder buffer 140 that stores the data from the unpacked frames. As long as the sequence number of an arriving packet 97 is greater than the sequence number of the frame being played out by the buffer 140, the sequence number is used to put the unpacked frame at its correct sequential position in the real decoder buffer 140. Therefore, the larger the size of the buffer 140, the later a frame can arrive at the receiver 75 and still be placed in a to-be-played-out frame sequence. On the other hand, as the size of the buffer 140 increases, the larger the overall delay can be in transporting the input 83 from the sender 65 to the receiver 75.

The receiver 75 includes a real decoder 130, a decoder 162 and a plurality of computation decoders 150. The real decoder depacketizer 135 receives the data packet sequence 96. Initially, the depacketizer 135 reads the actual Redundancy variable 115 contained in each data packet 97. Using the actual Redundancy variable 115, the depacketizer 135 unpacks the data packets 97 and recovers the frames 85. The frames 85 include both current and redundant frames.

The real decoder 130 reads the sequence number and the time stamp of a current frame. Redundant frames associated with the current frame have the same time stamp as the current frame since, within a given packet, redundant and current frames were both originally communicated from the packetizer 90 at approximately the same point in time. Since the order or sequence of the redundant frames is known, the redundant frame sequence numbers can be inferred from the current frame sequence number.

Preferably, each frame, together with its corresponding time stamp and sequence number, defines a node 137. The nodes 137 are forwarded to a real decoder buffer 140 for buffering. Redundant frames are not buffered if an original frame has been previously buffered. The buffered frames are then passed on to a decoder 162. The decoder 162 decompresses the frames 142. The decompressed frames 163 are then forwarded to a digital-to-analog converter 164 (i.e., D/A converter 164). The D/A converter 164 converts the digital data 163 to an analog output 165. This analog output 165 represents the original analog input 72 generated by the first calling device 70. The analog output 165 is forwarded to the second calling device 166 where the output 165 is then played out.

By monitoring various transporting characteristics of the transporting network 35, the present communication channel 60 offers a number of advantages. For example, the present communication channel can adapt to varying transporting dynamics and conditions of the transporting network 35. For a non-guaranteed packet switched network, the network transporting dynamics can be assessed by a packet delay distribution and a packet loss percentage, both of which generally vary over time.

In general, as the length of the real decoder buffer 140 increases, the quality of the played out analog output 169 also increases. Unfortunately, as in the case of transporting a telephone call over the transporting network 35, if the network packet delay is large, maintaining an interactive conversation may be difficult. On the other hand, if the real decoder buffer length is quite small (i.e., small in comparison to the standard deviation of network delay), frames with larger delays will arrive too late to be played out and will consequently be considered lost during transportation over the network 35. Therefore, it is preferred that the real decoder 130 have a buffer 140 that has a variable buffer length. Preferably, the buffer length will vary in accordance with the dynamic transporting characteristics of the network 35.

More preferably, the buffer length is proportional to the variance in delay experienced by the transported data packets 97. A non-guaranteed packet switched transporting network, such as transporting network 35, having a highly varying data packet delay results in an increased buffer length. Conversely, where a transporting network experiences a more constant data packet delay, the buffer length will be decreased.

A buffer length of X milliseconds is employed where X is a dynamic parameter. Utilizing a buffer having a dynamic buffer length of X milliseconds, after the arrival of an unpacked node 137 from the real decoder depacketizer 135, X milliseconds must on average time out before the buffer 140 can start playing out at a constant rate of 1 frame per 30 milliseconds. Alternatively, the buffer 140 plays out at the frame rate used by the encoder 80.

Preferably, the buffer 140 is implemented as having a doubly linked list (LL) structure. In such a preferred structure, the nodes 137 are ordered according to their respective sequence number. Each node 137 contains a pointer that points to the preceding and succeeding nodes in the structure. Each node 137 is inserted into the buffer 140 at the appropriate linked list position, If a node already exists in the buffer 140, the redundant node is discarded. Moreover, if the sequence number of the frame being played out 163 by the decoder 162 is greater than the sequence number of an arriving node 137, then the arriving node 137 arrived too late and is discarded. Based on the frame length of the encoder 80, the buffer 140 plays out frames 142 at periodic instances of time. Preferably, as in the case for a G.723.1 encoder, the buffer 140 plays out one frame every 30 ms.

As shown in FIG. 2, the receiver 75 contains N computation decoders 150. These N computation decoders 150 are arranged in parallel with the real decoder 130. Preferably, the number of computation decoders N is a product of the cardinality of the domain of two variables: the Redundancy and the BufferLength. As noted previously, the Redundancy defines the number of previous frames packeted into each data packet 92. The BufferLength defines the number of nodes 137 buffered by the real decoder buffer 140 before play-out. As the BufferLength increases, fewer nodes 137 will arrive too late to be played-out by the buffer 140.

Like the real decoder 130, the computation decoders 150 receive and observe the data packets 97 of the incoming data packet sequence 96. Each computation decoder 150 includes a computation decoder depacketizer 152 and a computation decoder buffer 154.

The computation decoders 150 operate differently than the real decoder buffer 140. One difference is that the computation decoders 150 do not read the actual Redundancy variable 115 from an arriving data packet 97. Rather, each individual computation decoder uses an assigned fixed Redundancy [i] variable 153. This fixed Redundancy 153 is used to extract the frames 85 from the transported data packet 97. The fixed Redundancy [i] variable is a hypothetical Redundancy value and is used by computational decoder [i], and is an index to the computation decoders [i . . . N].

Each computation decoder 150 computes various characteristics of the transporting network 35. Preferably, each computation decoder 150 computes two values: an AveDelay [i]; and an AveLoss [i]. Each computation decoder 150 also has an assigned Rate [i] 151.

Even when the actual Redundancy variable 115 of a data packet 97 is less than the fixed Redundancy [i] parameter 153 of a corresponding computation decoder 150 [i], the computation decoder 150 computes two utility parameters: AveLoss [i] 160 and AveDelay [i] 158.

The AveLoss [i] parameter 160 is a measure of the average number of the originally transported data packets 95 lost during transportation. In addition, the AveLoss [i] parameter takes into account the data packets 92 originally transported but accounted for as being lost during transportation since these packets were received too late to be played out by the buffer 140. AveLoss [i] 160 provides one method to quantify a difference between the data packets 95 originally sent by the sender 65 and the data packets 97 actually received by the receiver 75.

The AveDelay [i] parameter 158 is a measure of the average time it takes for the data packets 92 to be transported from the sender 65 to the receiver 75. The AveDelay [i] parameter 158 preferably also includes the time required for the buffer 140 to playout the frames 142. These measures are computed from the time stamp and sequence number associated with the transported data packets 92. In this case, AveDelay [i] 158 is equal to the sum of the one way delay plus the receiver buffer time. The receiver buffer time can be estimated by multiplying the receiver Buffer Length by the period of the frame rate. The one way delay is estimated by adding an estimate of the network delay to the Receive Buffer Delay.

AveLoss [i] 160 is determined by the flowchart algorithm of the computation decoder as will be discussed with reference to FIG. 12.

The fixed Redundancy variable 153 associated with each computation decoder can be greater than, less than, or equal to the actual Redundancy variable 115. When a particular fixed Redundancy [i] variable 153 of a corresponding computation decoder [i] 150 is greater than the actual Redundancy variable 115, some of the frames 85 of the data packet 97 are unavailable to the computation decoder 150. This does not matter, however, since the computation decoder 150 only requires the time stamp and the sequence number of a received data packet 97. Moreover, the time stamp and the sequence number for all the redundant frames can be inferred. These values can be inferred since time stamps remain unchanged and sequence numbers are in sequential order for the hypothetical case of the computation decoder. This is true even when the actual Redundancy parameter 115 and a fixed Redundancy [i] parameter 153 differ.

Each computation decoder has three unique values associated with it. The three values of each computation decoder AveDelay, AveLoss and Rate defines the utility of the computation decoder for a given data packet transportation. As shown in FIG. 2, the three values AveDelay [i] 158, AveLoss [i] 160 and Rate [i] 151 of each computation decoder 150 are analyzed by a utility function 170. The utility function 170 selects the optimal computation decoder that would have resulted in the highest utility for a transported data packet.

The utility of a particular computation decoder 150, and therefore the utility of the overall receiver 75, is application specific. Preferably, the utility is a function of the average delay AveDelay 158, the average loss rate AveLoss 160 and the Rate 151. Rate is a measure of the bandwidth required to transport the media stream which is increasing with redundancy. Since the AveLoss rate is a function of the actual Redundancy parameter 115, the utility function 170 is preferably a function of three network transmission characteristics represented by these three variables. The utility function 170 preferably has the following form U(AveDelay, AveLoss, Redundancy) and if separability is desired, it may be expressed as follows:

$$U(AveLoss, AveDelay, Redundancy) = U_L(AveLoss) * U_D(AveDelay) * U_R(Redundancy)$$

where $U_L(AveLoss)$ is the loss utility function, $U_D(AveDelay)$ is the delay utility function, and $U_R(Redundancy)$ is the Redundancy utility function. Alternatively, the utility function can be expressed in other forms, such as a non-seperable, non-linear function in the form of a table.

The general purpose of the utility function 170 is to rate the different type computation decoders 150. In this manner, the computation decoding values of Redundancy [i] and BufferLength [i] that would have optimized data packet transportation at a given time is selected. These optimal values determine the new values for the actual Redundancy 115 and the BufferLength 174.

The utility function 170 is application specific and can be modified to best fit the type of analog input 72 being transported. The application's specific nature of the utility function can be explained by way of the following example. If a specific type of application calls for a maximum loss rate of 10%, a loss utility function $U_L$ can be represented by the graph shown in FIG. 14. As shown in this graph, as long as the loss rate is less than or equal to 10%, the loss utility function $U_L$ will be equal to 1. Any loss rate greater than 10% will result in the loss utility function $U_L$ to be equal to zero (0).

Figure 15:
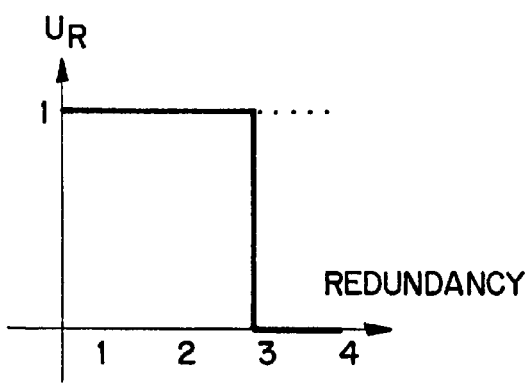
FIG. 15 is a graph of a Redundancy utility function $U_R$ having a Redundancy less than or equal to three (3).

In this example, it is further assumed that the specific application is not overly concerned with redundancy as long as no more than three (3) redundant frames are used. The resulting redundancy utility function $U_R$ can be expressed graphically as shown in FIG. 15. According to FIG. 15, as long as the redundancy utility function $U_R$ is equal to or less than three (3), the utility function $U_R$ will equal one (1). Any Redundancy greater than three (3) will result in a redundancy utility function $U_R$ equal to zero (0).

The third concern in this example is the data packet transportation delay. Returning to the example discussed with respect to FIGS. 14 and 15 and given the above $U_L$ and $U_R$, it will be assumed that the example will require a delay of less than or equal to one (1) second. Any greater delay will result in the delay utility $U_D$ equal to zero (0). This requirement can be graphically represented as shown in FIG. 16.

Figure 14:
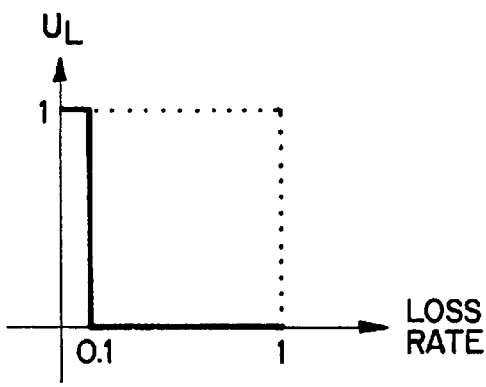
FIG. 14 is a graph of a loss utility function $U_L$ having a loss rate less than or equal to ten (10).
Figure 16:
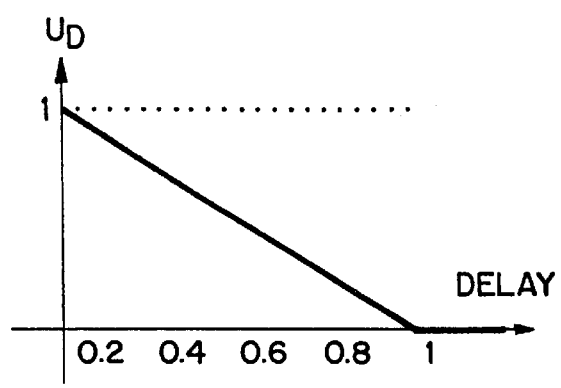
FIG. 16 is a graph of delay utility function $U_D$ having a delay less than or equal to one (1) second.

Taking the utility functions $U_L$, $U_R$, and $U_D$ shown in FIGS. 14, 15, and 16, respectively, one can define an overall utility function U(AveLoss, AveDelay, Redundancy) to be the product of these three individual utility functions. A computation decoder that maximizes this function will specify in an average loss less than or equal to 10%, specify three or fewer redundant frames and specify the smallest possible average delay, given the first two constraints.

Figure 17:
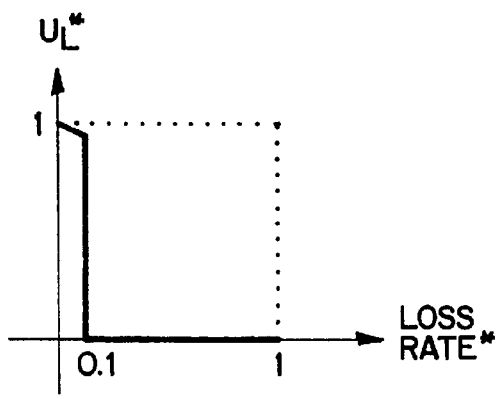
FIG. 17 is a graph of modified loss utility function $U_L^*$ of the utility function $U_L$ shown in FIG. 14.
Figure 18:
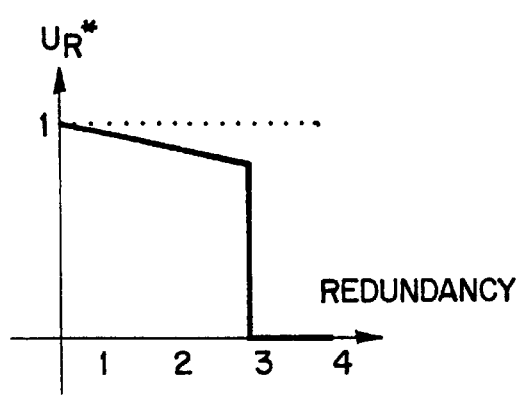
FIG. 18 is a graph of a modified redundancy utility function $U_R^*$ of the redundancy utility function $U_R$ shown in FIG. 15.

Preferably, where two computation decoders 150 result in exactly the same delay $U_D$, the decoder 150 using the lesser amount of redundancy $U_R$ or that results in the smaller loss rate $U_L$ is selected. Preferably, this selection process is accomplished by slightly altering the loss and redundancy utility function $U_L^*$ and $U_R^*$, respectively. For example, a modified loss rate $U_L^*$ and a modified Redundancy rate $U_R^*$ is shown in FIGS. 17 and 18, respectively.

The Redundancy value 172 and BufferLength value 174 of the optimal computation decoder are utilized as follows. First, the Redundancy value 172 is packetized into a feedback data packet 178 that is transported to the packetizer 90 of the sender 65. The sender 65 adjusts the actual Redundancy variable 115 based on the new Redundancy value 172.

Secondly, the optimal BufferLength value is communicated to the real decoder buffer 140. The real decoder buffer 140 uses the preferred BufferLength value 174 to buffer the nodes 137. Preferably, the Redundancy and BufferLength are chosen periodically with intervals of one (1) to ten (10) seconds in a typical implementation.

It is important to note that the fixed Redundancy values 153 and the fixed BufferLength values 156 associated with the computation decode 150 are constant. These values are therefore not adjusted according to the transmission characteristics of the transporting network 35. Rather. it is the function of all the computation decoders 150, by using various Redundancy value 153 and BufferLength 156 combinations, to determine an optimal value of these two variables based on the transport characteristics of the network 35 at a given time.

The selected computation decoder 150 has highest utility for a given data packet transportation and therefore provides the best choice of system variables given the network conditions at a given time. This allows for the flexibility of using a variety of utility functions for different types of applications. For example, for a streaming application, or a one way communication, the AveDelay $U_D$ can be quite a bit larger than for an interactive application. On the other hand, a streaming application may require a higher quality than the interactive call or video conference application.

The real decoder decompression scheme matches the encoder scheme used to compress the input 83. Preferably, the decoder 162 is a G.723.1 decoder where the input to the decoder is a frame stream. The output of the decoder 160 is a waveform in the same format as the analog input 83 for the G.723.1 encoder.

FIG. 3 illustrates the structure of a data packet 92 transported by the communication channel shown in FIG. 2. Preferably, each data packet has a data packet header that is a thirty-two (32) bit word containing a Redundancy parameter 115, a current frame and a plurality of redundant frames. The RT Header 110 is a Real Time Protocol header containing a sequence number and time stamp. The Real Time Protocol contains a field which identifies how the remainder of the data packet may be interpreted. Packets of 95 or 96 (FIG. 2) may be Real Time Protocol packets which contain packets from the protocol described here.

In a preferred embodiment, and referring to FIGS. 2 and 3, the message data 108 reads 0000 for data packets 92 transmitted from the sender 65 to the receiver 75. For the feedback packet 178 sent from the receiver 75 to the sender 65, the message data 108 of the packet reads 0001. This message data field allows the sender 65 and the receiver 75 to differentiate between data and feedback packets. The feedback packet 175 preferably does not contain a frame length or frame data. Rather, the feedback packet 175 contains information relating to the desired value to be used for the actual Redundancy variable 115. The header spare 109 is reserved for later use for data packets from sender to receiver. For data packets sent from the sender to the receiver, the Redundancy 115 variable represents the number of additional previous frames that each data packet 95 contains. The frame length 120 represents the length of the following frame data field in bytes.

FIG. 4 illustrates an example of a preferred order of the redundant frames in five levels of data packets wherein the actual Redundancy variable 115 is set equal to two (2). With a Redundancy variable set equal to 2, the packetizer 90 packs two previously transmittal frames into each data packet 95. For example, as shown in FIG. 4, with respect to Frame n 186, Packet n 192 contains Frame n 186 and its two previous frames: Frame n−1 184 and Frame n−2 182. Similarly, Packet n+1 194 contains Frame n+1 188, along with its two previous frames: Frame n 186 and Frame n+1 188. Packet n+2 196 contains Frame n+2 190 along with its two previous frames: Fame n+1 188 and Frame n 186. In a scheme having an actual Redundancy variable 115 equal to two (2) therefore, each packet 95 includes a current frame along with the two previous frames.

Figure 5:
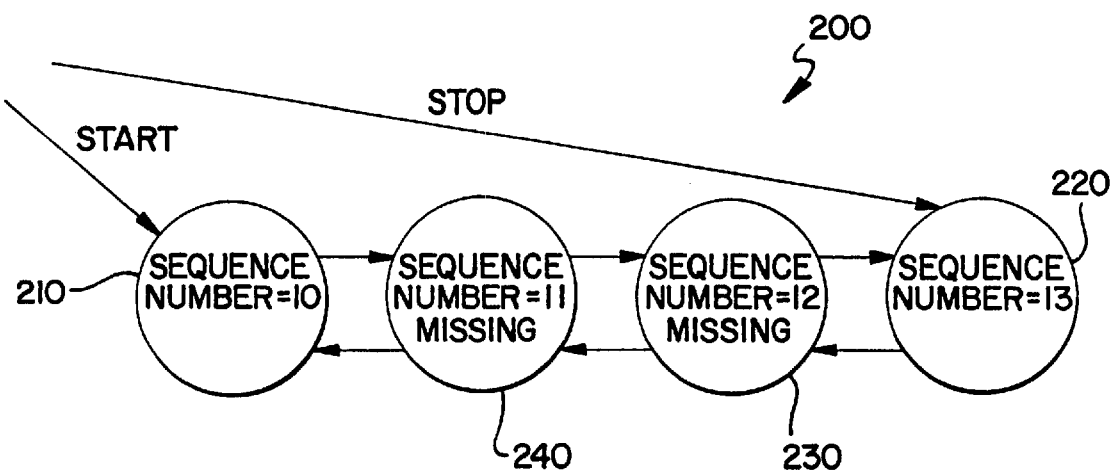
FIG. 5 is an illustration of a linked list structure of a real decoder buffer shown in FIG. 2.

FIG. 5 illustrates an example of a preferred double linked list (LL) 200. This example has a Start node 210 having a sequence number equal to 10 and a Stop node 220 having a sequence number equal to 13. The preferred real decoder buffer implementing the LL 200 keeps track of the first or Start node and the last or Stop node. In a preferred embodiment, the LL 200 contains all the nodes having sequence numbers that fall between a Start node and a Stop node.

If the real decoder buffer 140 receives a frame within node 137 having a sequence number 10 and another frame with sequence number 13, then the LL creates all the nodes falling between and including the Start and Stop nodes, i.e., 10, 11, 12, 13 (i.e., element numbers 210, 240, 230 and 220, respectively). All four nodes 10, 11, 12, and 13 will be created even though frame sequence number 11 and frame sequence number 12 have not yet been received. The created nodes 230 and 240 are marked as missing.

Figure 7:
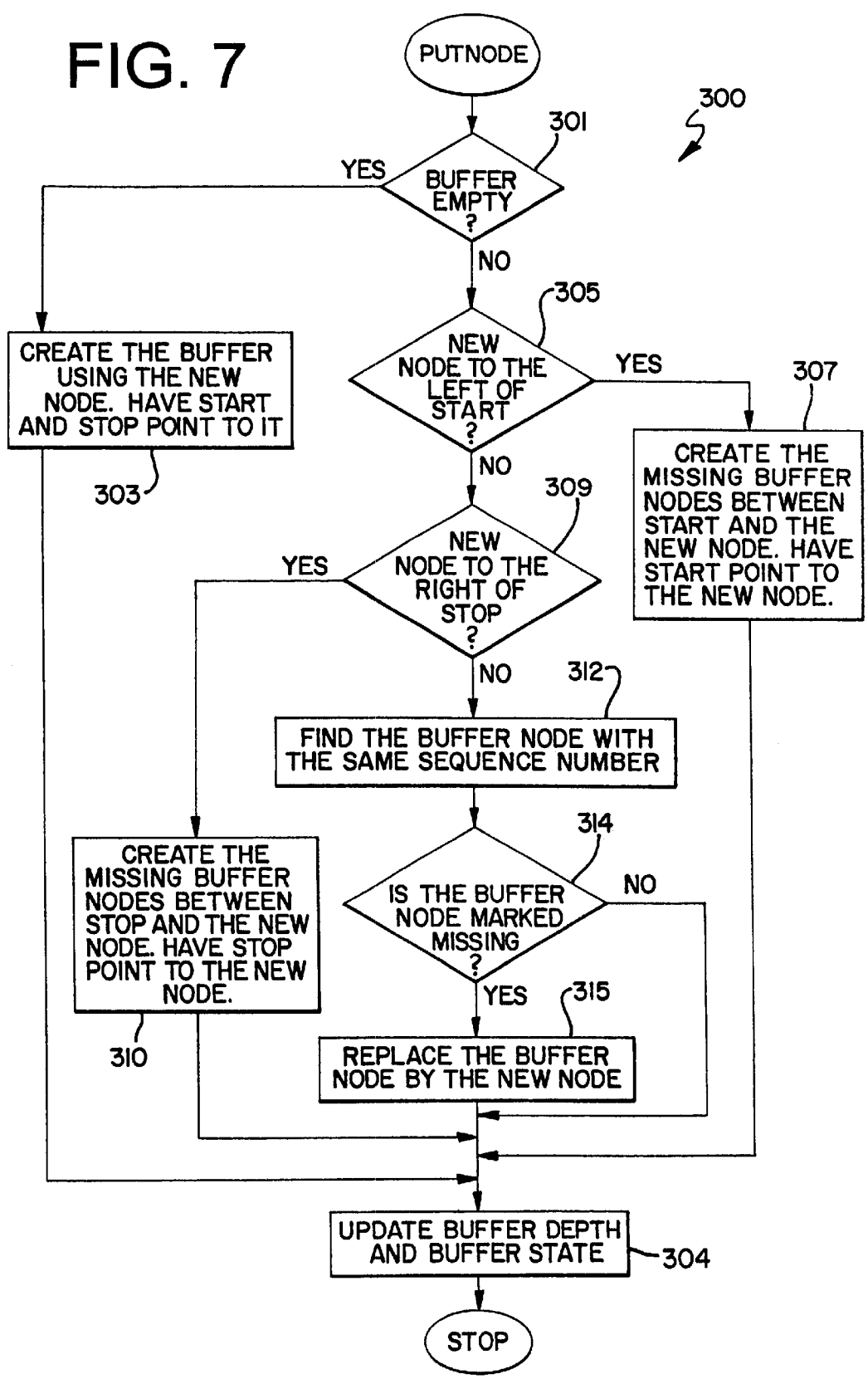
FIG. 7 is a flowchart of a PutNode function for the real decoder shown in FIG. 2 and which accesses the linked list structure shown in FIG. 5.

Two functions are provided for accessing the LL 200. The first function is the PutNode function. The LL 200 utilizes the PutNode function to insert a node in the correct LL position. FIG. 7 illustrates a flowchart of a PutNode function 300 for the real decoder 130 shown in FIG. 2. With reference to FIGS. 2 and 7, the buffer 140 receives a node 137 from the depacketizer 135, the PutNode function 300 must determine where to put this node. The PutNode function 300 first determines whether the real decoder buffer 140 is empty 301. If the real decoder buffer is empty, the function 300 creates the buffer using the new node at step 303. A Start and a Stop pointer associated with this new node now point to this new node at step 303. The function 300 then updates the real decoder buffer depth and the real decoder buffer state at step 304.

Alternatively, if the buffer 140 is not empty, then at step 305 the PutNode function 300 determines whether the new node should be placed to the left of the existing Start node 305. If the new node should be placed to the left of the existing StartNode, then at step 307 the missing buffer nodes are created between the existing StartNode and the new node. The new start will now point to the new node. The PutNode function 300 then updates the real decoder buffer depth and the real decoder buffer state at step 304.

If the PutNode function 300 determines that the new node should not be placed to the left of the existing StartNode, then at step 309 the PutNode function 300 determines whether the new node should be placed to the right of the existing Stop node. If the new node should be placed to the right of the existing Stop node, then the missing buffer nodes between the Stop node and the new node are created at step 310. The Stop pointer will now point to the new node 310. The PutNode function 300 then updates the real decoder buffer depth and the real decoder buffer state at step 304.

If the Putnode function 300 determines that the new mode is not to be placed to the left of the existing Start node or to the right of the existing Stop node, then the function 300 finds the existing buffer node with the same sequence number at step 312. The PutNode function 300 then determines whether the buffer node is marked as missing at step 314. If the buffer node has been marked as missing, the buffer node is replaced by the new node at step 315. The function 300 then updates the real decoder buffer depth and the real decoder buffer state at step 304. If the buffer node has not been marked as missing, then the function 300 updates the real decoder buffer depth and real decoder buffer state at step 304 without replacing the buffer node.

Figure 6:
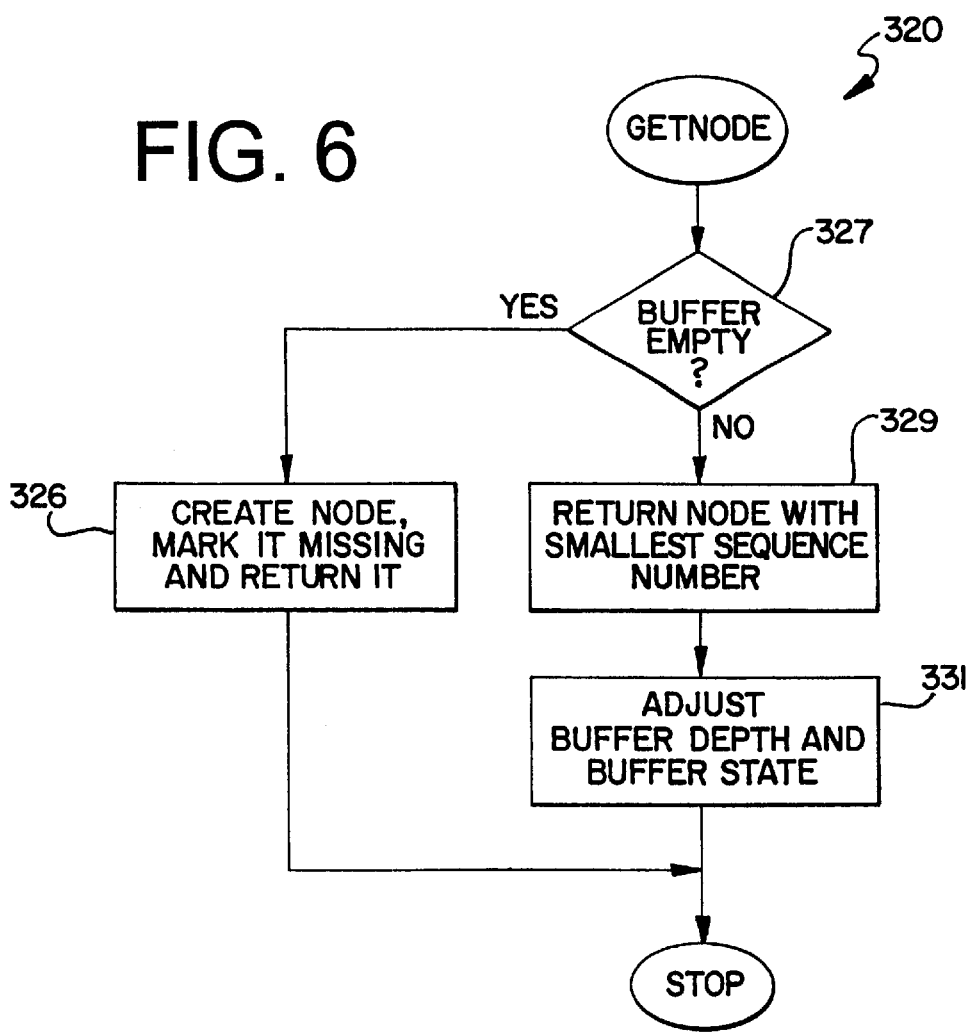
FIG. 6 is a flowchart of a GetNode function for accessing the linked list shown in FIG. 5.

The second function for accessing the LL 200 is the GetNode function. The buffer 140 utilizes the GetNode function for retrieving a node 137 having the smallest sequence number. A flowchart of the GetNode function 325 is illustrated in FIG. 6. At step 327, the GetNode function 325 first determines whether the real decoder buffer 140 is empty. If the buffer 140 is empty, then at step 326 a node is created. The newly created node is marked as missing and the node is returned to the buffer 140. If the buffer is not empty, then at step 329 the node having the smallest sequence number is returned. The GetNode function 325 then adjusts the real decoder buffer depth and buffer state at step 331.

Depending on the buffer depth, the buffer 140 can be in one of three different states: Fill, Normal and Drain. These transitions are controlled by the SetNode and PutNode functions. These three states Fill, Normal and Drain can be represented by the state transition diagram 350 illustrated in FIG. 8. This state transition diagram 350 shows how the real decoder buffer 140 changes state, depending on the buffer depth and the current state of the buffer.

Figure 8:
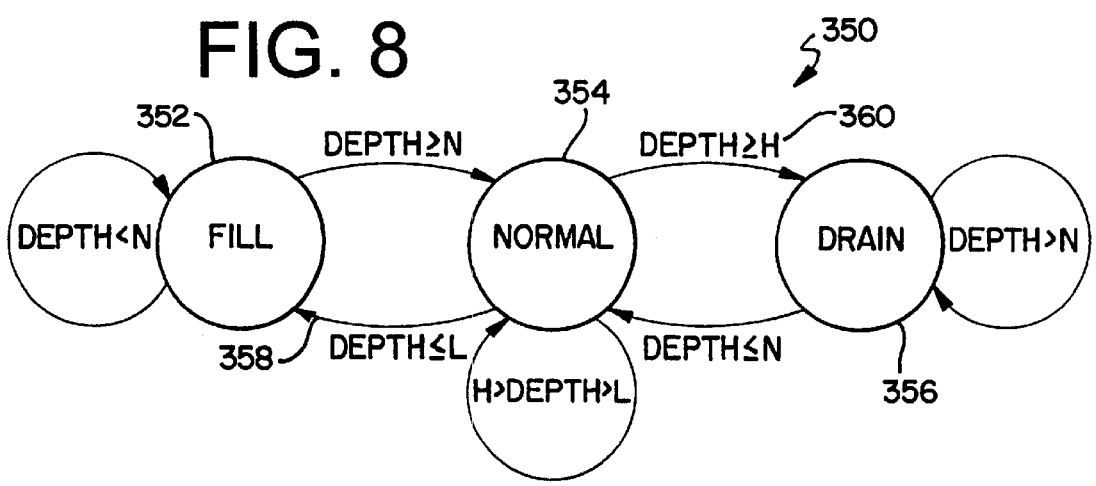
FIG. 8 illustrates a state transition diagram of the real decoder buffer illustrated in FIG. 2.

There are three critical buffer watermarks shown FIG. 8: Low (L), Normal (N), and High (H). The objective of the state diagram 350 is to maintain the buffer in its Normal state 354. For example, if while in the Normal state, the buffer depth falls below Low, the buffer changes state from the Normal state 354 to the Fill state 352 as shown in transition 358. The objective of the Fill state is to bring the buffer depth back to the Normal state 354. This objective may be achieved by artificially lengthening the next silence period until enough data packets arrive to return the buffer depth back to the Normal state 354. As long as the buffer depth stays between Low and High watermarks, the buffer state remains in the Normal state 354. If the buffer depth goes below the Low watermark 358, the buffer state switches back to the Fill state 352. If the buffer depth increases above the High watermark as shown by transition 360, the buffer state changes to the Drain state 356. The objective of the Drain state 356 is to shorten the silence periods and therefore reduce the buffer depth until it is returned to the Normal state 354. As long as the buffer depth is greater than N, the buffer will remain in the Drain state 356. Once the buffer depth is less than or equal to N as shown in transition 357, the buffer will become Normal again.

Preferably, the buffer control attempts to keep the buffer depth around the set BufferLength. This can be accomplished by setting the Normal water mark (N) equal to the BufferLength, the Low watermark (L) equal to half of the BufferLength and the High watermark (H) equal to 1.5 times the BufferLength.

There are basically two events associated with the real decoder buffer 140. The first event is the arrival of the data packet 96. The second event is defined as a TimeOut.

Figure 11:
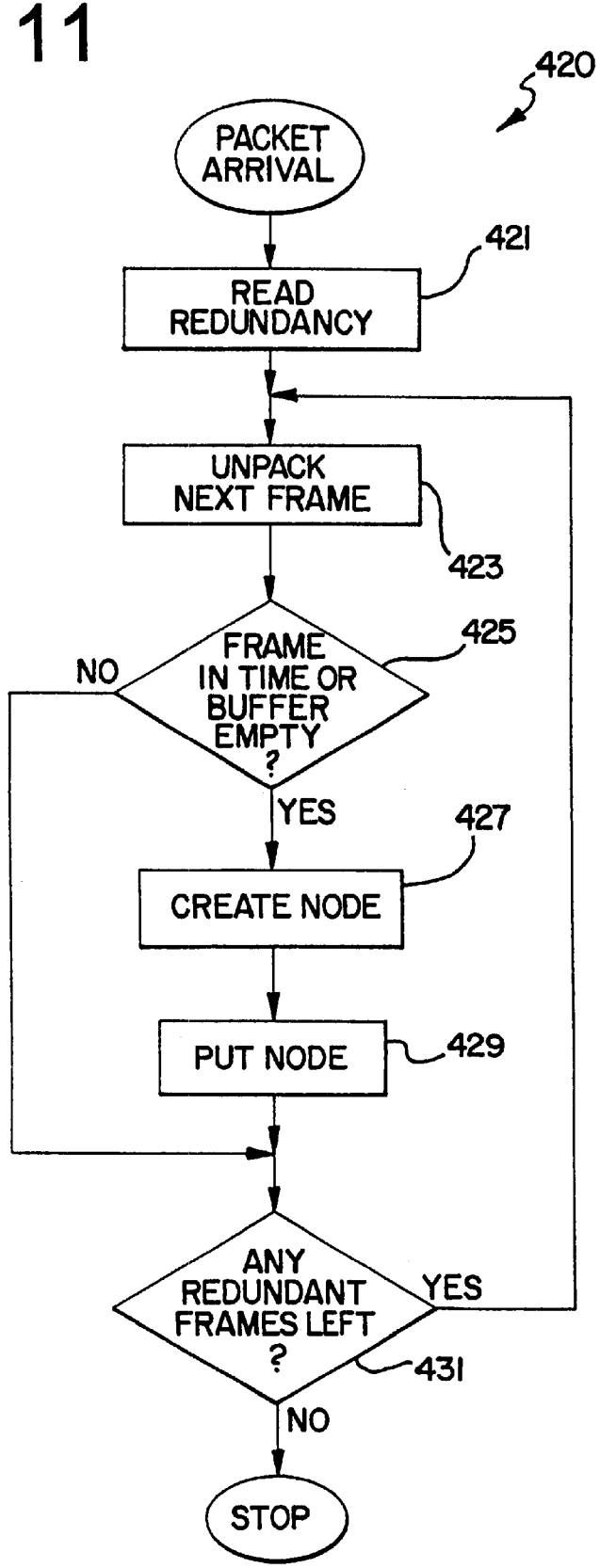
FIG. 11 is a flowchart of a PacketArrival function for the real decoder shown in FIG. 2.

The arrival of the data packet is defined as a PacketArrival. The arrival of transported data packets 96 is an asynchronous event and occurs whenever the real decoder 130 and computation decoders 150 receive a data packet. FIG. 11 provides a flowchart for the PacketArrival function 420 of the real decoder 130. After the data packet 96 is received, the real decoder 130 reads the actual Redundancy variable 115 at step 421 and unpacks the next frame at step 423. The PacketArrival function 420 then determines whether the frame has arrived in time for buffer play out or if the buffer is already empty at step 425. If the frame has arrived in time for play out and the buffer is empty, then a node is created at step 427. The PutNode function 300 as described with reference to FIG. 7 is then implemented at step 479. If the frame arrives late or if the buffer is not empty, it is determined whether any redundant frames are left 431. If redundant frames remain at step at step 431, then the frame unpacking and node generation process returns to step 423.

Figure 13:
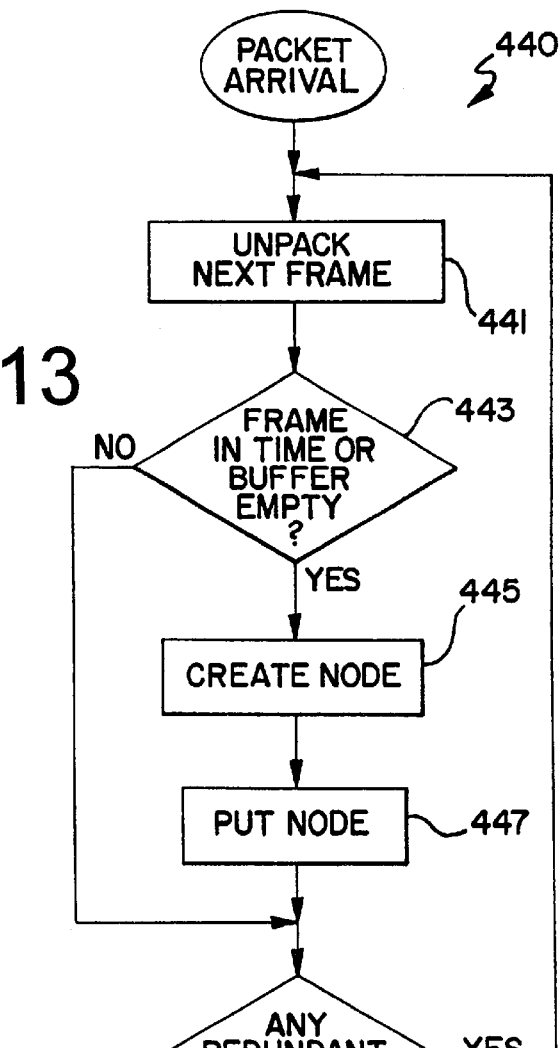
FIG. 13 is a flowchart of a PacketArrival function for one of the computation decoders shown in FIG. 2.

FIG. 13 provides a flowchart for the PacketArrival function 440 of the computation decoders 150. Once a data packet is received by a computation decoder 150, the computation decoder 150 unpacks the frames at step 441. At step 443, The PacketArrival function 440 determines whether the unpacked frame was received in time for play out and if the buffer is empty. If both are true, then a node is created at step 445 and the PutNode function 300 (shown in FIG. 7) is implemented at step 447. The PacketArrival function 440 then proceeds to determine whether any other redundant frames remains at step 449. If more frames remain, the PacketArrival function 440 returns to step 441.

If the frame was received late or it the buffer is not empty, the PacketArrival function 440 determines whether any redundant frames are remaining at step 449. If any frames are left at step 449, then the process returns to step 441 and the next frame is unpacked. In the computational decoder, the actual data frames do not need to be stored in the buffer. Instead, the buffer may be marked with an indication of a data frame being unpacked and stored.

Figure 9:
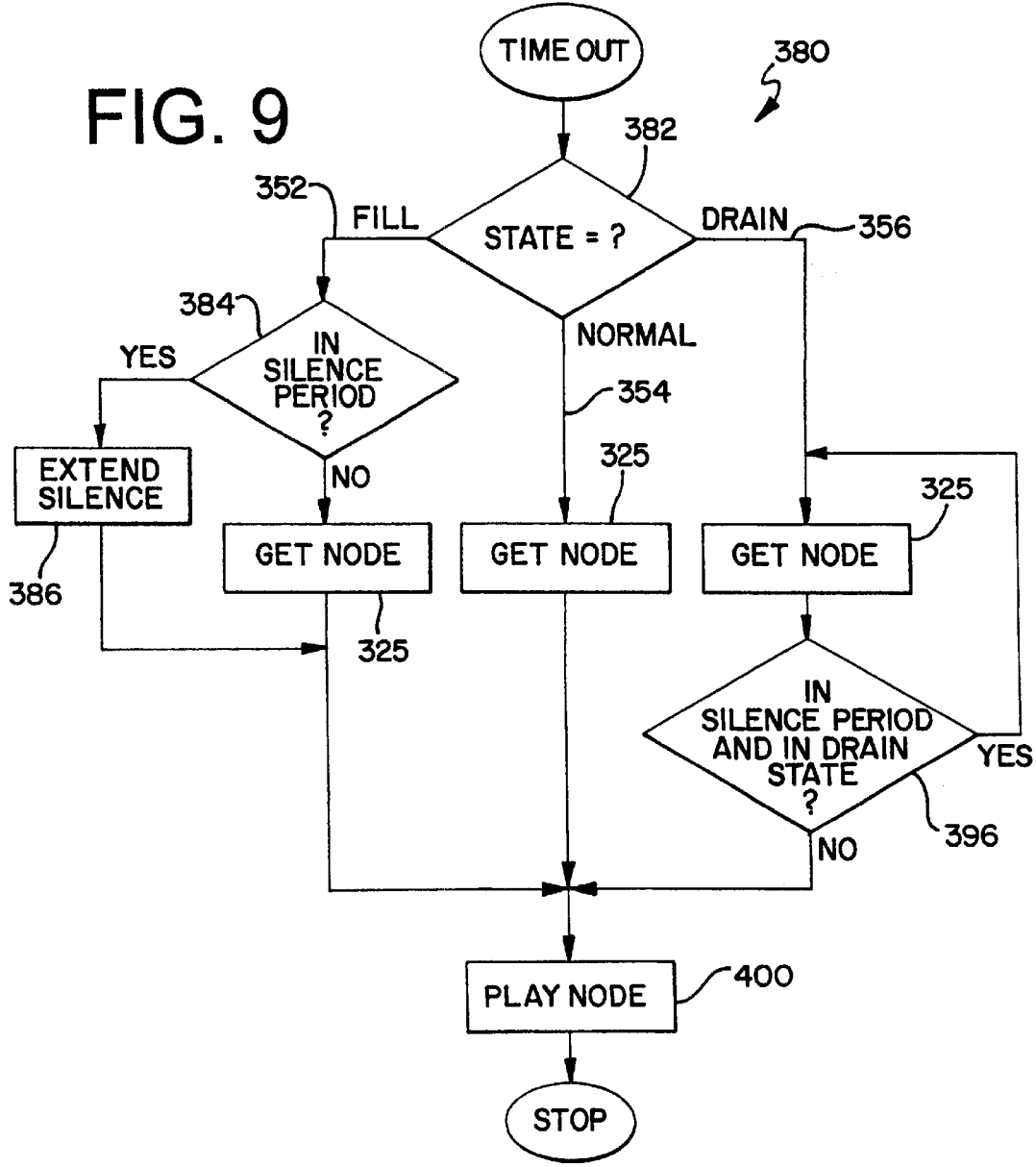
FIG. 9 illustrates a flowchart of a Time Out function for the real decoder buffer shown in FIG. 2.

The second event associated with the real decoder 130 is defined as a TimeOut. The TimeOut event is periodic and fixed to the frame size of the encoder 80. As previously discussed, the frame size and resulting TimeOut for the preferred G.723.1 system occurs every 30 milliseconds. FIG. 9 illustrates a flowchart for the TimeOut event 380.

At step 382, the TimeOut function 380 first determines the state of the buffer. If the buffer 140 is in the Fill state 352, the TimeOut function 380 proceeds to determine whether a silence period is detected at step 384. If a silence period is detected, the silence period is extended at step 386 until the buffer state switches to Normal 354. The function then returns to step 400 and executes the PlayNode function as previously described and shown in FIG. 12. If a silence period is not detected, the TimeOut function 380 implements the GetNode function 325 as previously described with reference to FIG. 6. After the GetNode function is implemented at step 325, the TimeOut function 380 returns to step 400, the PlayNode function, and the frame with the lowest sequence number is taken out of the buffer and played out.

If the TimeOut function 380 determines that the buffer is in the Drain state 356, the GetNode function as previously described with reference to FIG. 6 is implemented at step 325. After the GetNode function at step 325 is implemented, the TimeOut function 380 proceeds to step 396 to determine whether a silence period is detected and whether the buffer 140 is in the Drain state. If both are detected, the function 380 returns to the GetNode function 325. If both are not detected, the TimeOut function 380 returns to the PlayNode function at step 400.

If the TimeOut function 380 determines that the buffer is in the Normal state 354, the function 380 proceeds to the GetNode function 325. The TimeOut function 380 then returns to the PlayNode function at step 400.

Figure 10:
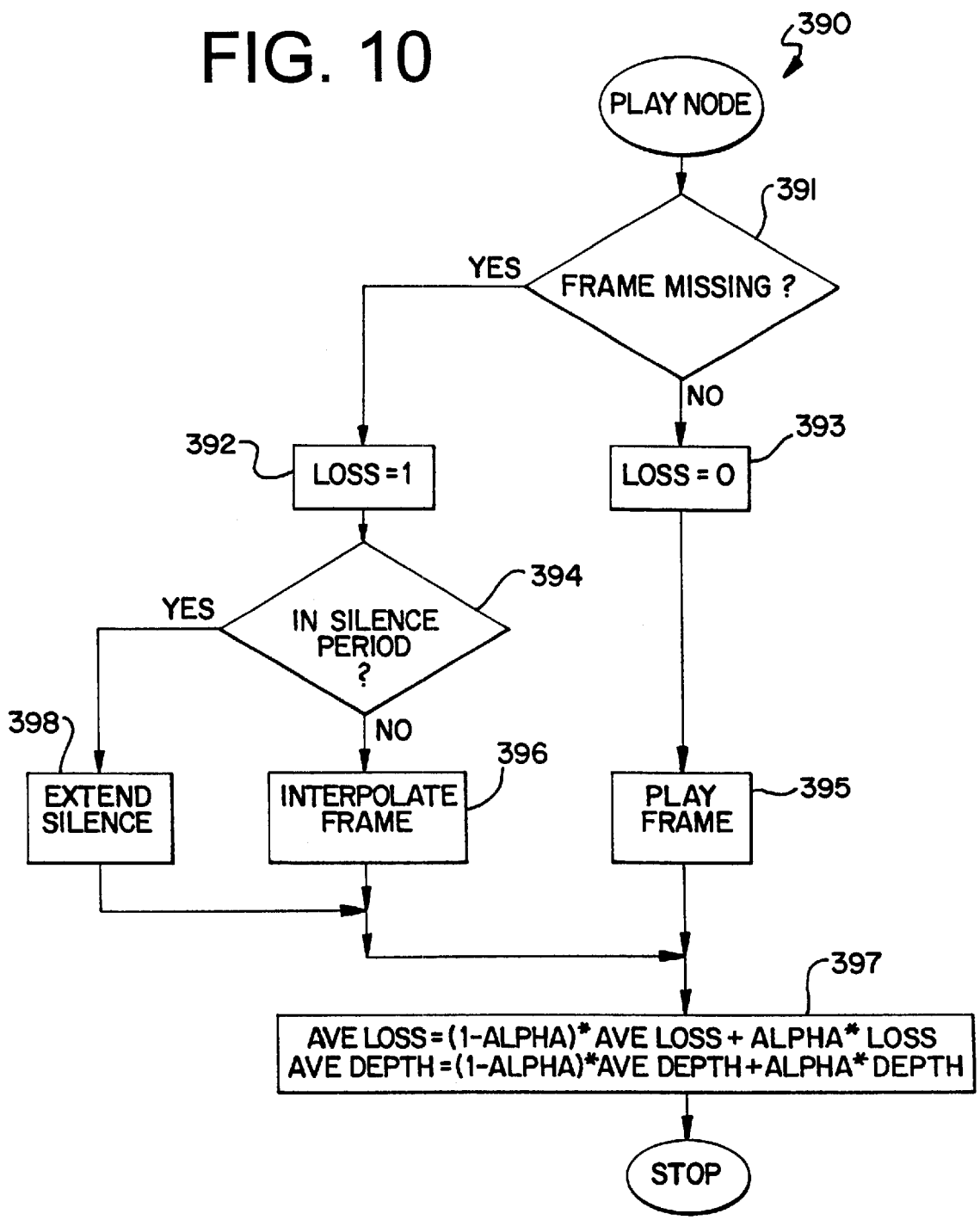
FIG. 10 illustrates a flowchart of a PlayNode function for the real decoder shown in FIG. 2.

There are two different types of PlayNode functions. The first is the real decoder 130 PlayNode function 390 is illustrated in FIG. 10. The second is the computation decoder PlayNode function 400, illustrated in FIG. 12. The purpose of the first PlayNode function 390 is to send the frame data to the playout decoder 160 which is called for whenever a TimeOut occurs. It is therefore invoked periodically with the period being equal to the encoder 80 frame length. The PlayNode function 390 first determines whether a frame is missing at step 391. If no frame is missing, the function 390 proceeds to step 393 where a loss bit is set to zero (0). Next, the frame is played at step 395. The AveLoss and AveDepth statistics are then updated at step 397.

If the first PlayNode function 390 determines at step 391 that a frame is missing, then the function 390 proceeds to step 392 where the loss bit is set to one (1). Next, the function 390 determines whether a silence period is detected at step 394. If a silence period is detected, then the silence is extended at step 398. If a silence period is not detected at step 394, then a frame is interpolated at step 396. This efECtively plays a frame that is an estimation of the missing frame. The AveLoss and AveDepth statistics are then updated at step 397.

Figure 12:
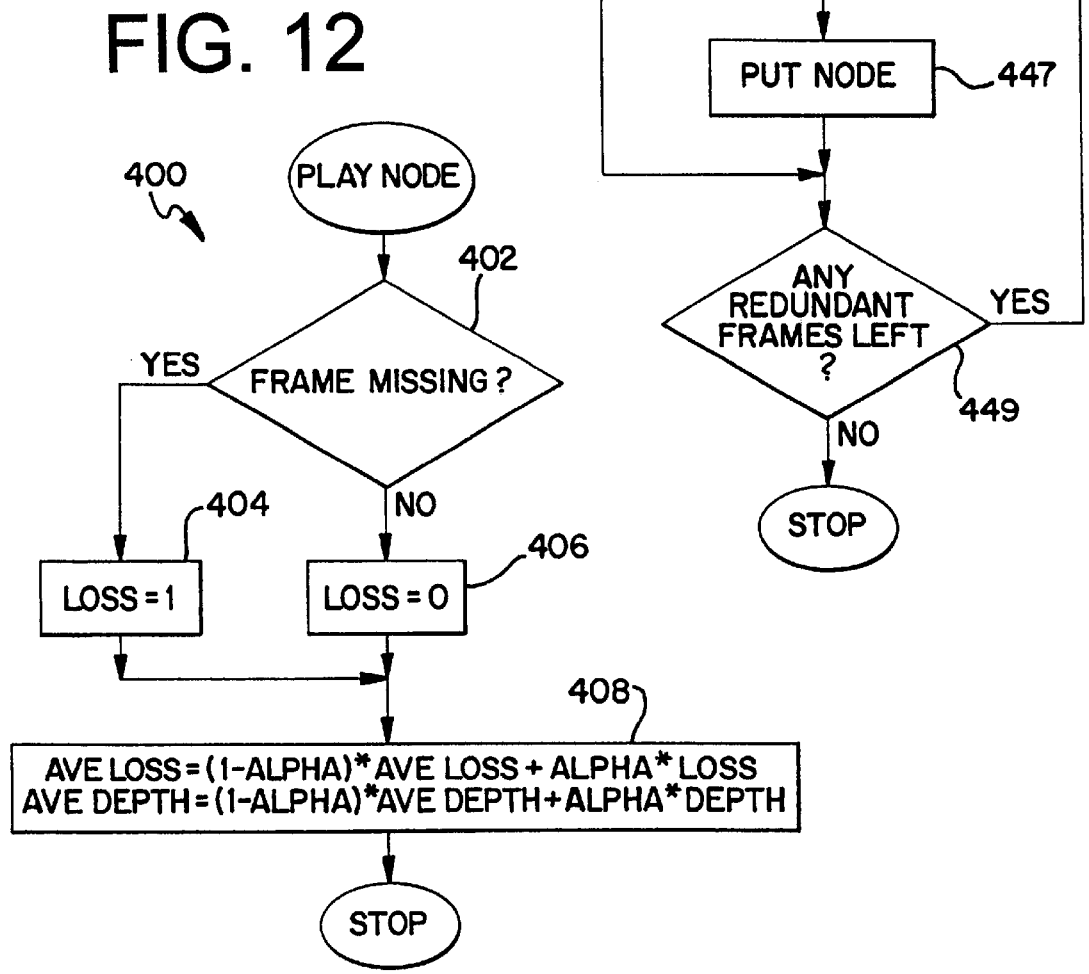
FIG. 12 illustrates a flowchart of a PlayNode function for one of the computation decoders shown in FIG. 2.

The second type of PlayNode function 400 is that of the computation decoders 150 and is illustrated in FIG. 12. The second Playnode function 400 first determines at step 402 whether a frame is missing. The second Playnode function 400 sets a loss bit equal to one (1) if the frame is missing at step 404. The loss is set to zero (0) if the frame is not missing. The second PlayNode function 400 then updates the AveLoss and the AveDepth statistics of the transporting network with these new values at step 408.

The preferred utility function 170 evaluates or maps the new value of the variable Bufferlength 174 and a new value of the variable Redundancy 115. The variable BufferLength 174 is altered by first changing the three watermarks as described with reference to the buffer state diagram 350 and then changing the buffer states 352, 354 and 356. The Normal watermark value in the real decoder will change to the new BufferLength variable. Other watermark values (High and Low) may be determined either by alogrithm or by copying some values from computational decoder which yielded the largest utility parameter. If a larger buffer state is changed to a smaller one, then the adjustment of the buffer state may result in a Drain state 356. Consequently, the buffer 140 starts shortening the silence periods. If the buffer is increased, then the adjustment of the buffer state may result in a Fill state 352. Consequently, a subsequent silence period will be extended until the buffer fills up to the Normal watermark 354. The new Redundancy variable will be communicated back to the sender.

The operation of the communication channel 60 will now be described with reference to FIG. 2. A first calling device 70 generates a real time media signal 72, preferably a telephone call. Alternatively, the signal 72 is video, multimedia, a streaming application or a combination thereof. The signal 72 is communicated to an analog-to-digital converter 82 (i.e., A/D converter 82). The A/D converter 82 converts the signal 72 to a digital signal 83. Preferably, where the signal 72 is a phone call, the digital signal 83 is a digital speech wave form.

The digital signal 83 is communicated to an encoder 80 of the sender 65. In the case of a phone call, the digital signal 83 is communicated to the encoder 80 over a telephone line. The digital input 83 (preferably in Pulse Code Modulated (PCM) form) is compressed and partitioned by encoder 80 into a sequence of frames 85. The encoder 80 encodes the digital signal 83.

Preferably, in the case where the communication channel 60 is used to communicate voice, the encoder 80 is an ITU voice encoder complying with Recommendation G.723.1. Recommendation G.723.1 describes a code excited linear predictive encoder (CELP). This recommendation G.723.1 specifies a coded representation used for compressing speech or another audio signal component of multimedia services at a low bit rate as part of the overall H.324 family of standards. Recommendation G.723.1 is entitled "DUAL RATE SPEECH ENCODER FOR MULTIMEDIA COMMUNICATIONS TRANSMITTING AT 5.3 & 6.3 KBITS/ S" and is published by the Telecommunication Standardization Sector of the ITU. Recommendation G.723.1 is herein entirely incorporated by reference. Alternatively, voice encoders complying with other standards or specifications can be used.

Preferably, the digital input 83 to the encoder 80 is a digital speech waveform sampled at 8000 Hz. Each sample of the input 83 is represented by a signed 16 bit integer. The encoder 80, preferably the G.723.1 encoder, segments the input 83 into frames 85. Preferably, each frame is 30 milli-seconds (ms) in length. At the preferred sampling rate of 8000 Hz, 30 ms represents 240 samples.

The preferred G.723.1 encoder can operate at two different bit rates, a low rate of 5.3 kbits/seconds or a high rate of 6.3 kbits/seconds. In the high rate setting of 6.3 kbit/s, 480 bytes (i.e., 240 samples times 2 bytes/sample) are compressed to 24 bytes. In this high rate setting, where the input 72 is voice, the encoding results in a quality that is close to toll quality. In the low rate setting of 5.3 kbits/s, 480 bytes are compressed to 20 bytes. Therefore, between the low and high rate setting, the compression ratio varies from 20 to 24.

Preferably, the encoder 80 utilizes silence detection. The preferred G723.1 silence detection uses a special frame entitled Silence Insertion Descriptor (SID) frame. SID frame generation is described in Recommendation G.723.1 which has been herein entirely incorporated by reference. During a "silence", as that term is used herein, no voice data frames are generated by the encoder 80. An SID frame defines when a silence begins. After the encoder 80 transmits an SID frame, no further voice data frames are transmitted until the current silence ends. Updated SID frames may, however, be sent. This silencing technique reduces the required overall transfer rate. Moreover, as will be discussed, silence detection allows for a dynamic adjustment of the depth of the real decoder buffer 140. The communication channel 60 can thereby compensate for varying transportation characteristics of the transport network 35.

The packetizer 90 packets the frames 85 into a plurality of data packets 92. Preferably, the packetizer 90 places a time stamp and a sequence number into each data packet 92. The time stamp identifies the time a specific data packet 92 was created. The sequence number identifies data packet ordering. Each data packet 92 includes both a current frame as well as redundant information such that a number of previously packeted frames might be reconstructed if some frames are lost during transportation. In one implementation, the number of previous frames or redundant frames is channel coded according to the actual Redundancy variable 115 of the communication channel 60. The actual Redundancy 115 is the variable that determines the number of previous frames packet into each data packet 92. The data packets 92 are ordered in a data packet sequence 95 and transported by the transporting network 35 to the receiver 75.

Each data packet time stamp enables the receiver 75 to evaluate certain dynamic transporting characteristics of the transporting network 35. These transporting characteristics determine how the packetizer 90 packetizes the frames 85 and how the receiver 75 unpacks these frames. These varying transporting characteristics can include such characteristics as the standard deviation of one-way delay or the round trip time for each transported data packet 97. The round trip time is calculated by transporting a copy of the time stamp back to the sender 65 and comparing the received time with the timestamp value. The standard deviation of one-way delay is typically approximated by averaging the absolute value of differences between time stamp values and received times for each packet 97. Alternatively, if real time protocol (RTP) is used, data packet sequence numbers and time stamps are placed within the RTP header. The sequence numbers and timestamps do not, therefore, need to be reproduced in the data packet payload. Other transport protocols that contain timestamps and sequence number information can also be used in place of the RTP protocol.

The receiver 75 receives a sequence of data packets 96. This sequence of data packets 96 may vary from the sequence of data packets 95 originally communicated to the transporting network 35. The variance between the two data packet sequences 95, 96 is a function of varying transporting characteristics such as packet loss and packet transport times.

Because the preferred transporting network 35 is a non-guaranteed packet switched network, the receiver 75 receives packets out of order vis-a-vis other data packets comprising the originally transported packet sequence 97. To combat this occurrence, as previously mentioned, the packetizer 90 adds sequence numbers to the frames 85 before the frames are packetized. As will be discussed with reference to the real decoder 130, the receiver 75 has a real decoder buffer 140 that stores the data from the unpacked frames. As long as the sequence number of an arriving, packet 97 is greater than the sequence number of the frame being played out by the buffer 140, the sequence number is used to put the unpacked frame at its correct sequential position in the real decoder buffer 140. Therefore, the larger the size of the buffer 140, the later a frame can arrive at the receiver 75 and still be placed in a to-be-played-out frame sequence. On the other hand, as the size of the buffer 140 increases, the larger the overall delay can be in transporting the input 83 from the sender 65 to the receiver 75.

The receiver 75 includes a real decoder 130, a decoder 162 and a plurality of computation decoders 150. The real decoder depacketizer 135 receives the data packet sequence 96. Initially, the depacketizer 135 reads the actual Redundancy variable 115 contained in each data packet 97. Using the actual Redundancy variable 115, the depacketizer 135 unpacks the data packets 97 and recovers the frames 85. The frames 85 include both current and redundant frames.

The real decoder 130 reads the sequence number and the time stamp of a current frame. Redundant frames associated with the current frame have the same time stamp as the current frame since, within a given packet, redundant and current frames were both originally communicated from the packetizer 90 at approximately the same point in time. Since the order or sequence of the redundant frames is known, the redundant frame sequence numbers can be inferred from the current frame sequence number.

Preferably, each frame, together with its corresponding time stamp and sequence number, defines a node 137. The nodes 137 are forwarded to a real decoder buffer 140 for buffering. Redundant frames are not buffered if an original frame has been previously buffered. The buffered frames are then passed on to a decoder 160. The decoder 160 decompresses the frames 142. The decompressed frames 163 are then forwarded to a digital-to-analog converter 164 (i.e., D/A converter 164). The D/A converter 164 converts the digital data 163 to an analog output 165. This analog output 165 represents the original analog input 72 generated by the first calling device 70. The analog output 165 is forwarded to the second calling device 166 where the output 165 is then played out.

A detailed C++ language program listing of an implementation of a buffer class for a receiver of the Internet telephony scheme is provided in U.S. patent application, Ser. No. 08/942,446 entitled ""Method and Apparatus for Real Time Communication Over Packet Networks" which has been previously herein entirely incorporated by reference and to which the reader is directed for further information. Additional detailed features of the system will become apparent to those skilled in the art from reviewing these programs.

As previously discussed, in a packet network, it is desired to transport a stream of packetized information such as voice or data over an internet protocol (IP) link. Unfortunately, IP networks may introduce time varying delay or jitter into the desired transportation of the packet stream. Because of data packet delay or jitter, a transported data packet may be received too late to be played out at an appropriate time. Consequently, such characteristics may cause packet loss. In addition, a packet may be dropped from the IP network while en rout to an end destination. This phenomenon may also be considered to result in a packet loss.

The receiver buffers that hold, re-order, and delay the play out of the packets, such as the receiver jitter buffer shown in FIG. 2, may be generally used to absorb varying transporting characteristics such as packet jitter. Redundancy methods, such as the use of the redundancy parameter previously discussed, may be one buffer play out factor that decreases packet loss. Alternatively, error correction coding (e.g., forward over correction or FEC) methods may be utilized and may present certain advantages. However, such methods are not without disadvantages. For example, utilizing redundancy or error correction coding introduces the requirement for additional decoder delay. Other disadvantages include an increased need for data processing at the encoder and decoder and an increase in bandwidth requirements.

Therefore, a tradeoff exists between packet delay and packet loss (i.e., improvements in one transporting characteristic may lead to degradations in another characteristic, and vice-versa). Ultimately, a jitter buffer size and accompanying error correction scheme may be selected for maximizing the subjective quality of the received and reconstructed data stream for each particular real time data application. (e.g., real time video, audio, and/or streaming applications).

Figure 19:
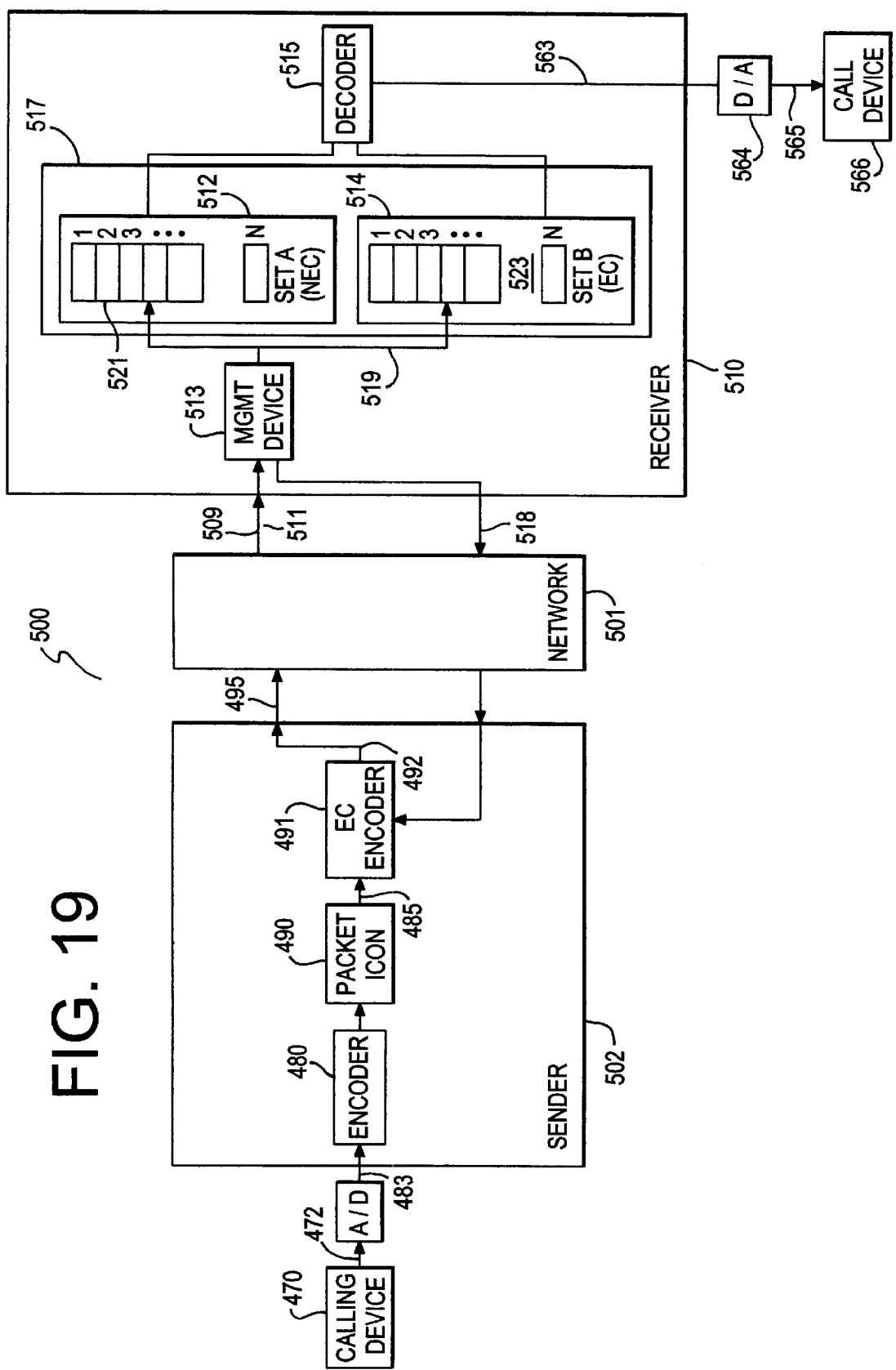
FIG. 19 illustrates an alternative embodiment of a communication channel in accordance with the system shown in FIG. 1.

As previously discussed, in one preferred embodiment, an IP gateway, such as receiver 75 of the communication channel 60 shown in FIG. 2, includes a real decoder and a set of computational decoders. This set of computational decoders includes a plurality of decoders. FIG. 19 illustrates an alternative embodiment of a communication channel 500, in accordance with the system 10 for transporting a real time media input over a packet network shown in FIG. 1. The communication channel 500 generally includes a sender 502, a network 501, and a receiver 510. Receiver 510 comprises a buffer management device 513, a first set A of jitter buffers 512, a second set B of jitter buffers 514, and a decoder 515. Alternatively, receiver 510 comprises more than two sets of jitter buffer.

Preferably, both set A and B include the same number, N, of buffers, each buffer within a given set having a different buffer length than any other buffer in the same set. However, only one set of jitter buffers utilize error correction coding, such as FEC. In the embodiment illustrated in FIG. 19, only the jitter buffers in set B utilize error correction. Alternatively, the receiver 510 may comprise various sets of jitter buffers, each buffer set utilizing different error correction codes. In this maimer, various error correction rates are achievable. For example, the receiver 510 may comprise three sets of jitter buffers. The first set having buffers without error correction coding, the second set of buffers having a first type of error correction, and the third set having a second type of error correction. In such alternative embodiment, the buffers within each set would be compared and an optimal buffer from each set would be selected. The three optimal buffers would then be compared and a preferred buffer would be chosen as the receiver buffer.

Communication channel 500 operates similarly to the communication channel illustrated in FIG. 2. The operation of channel 500 will be generally described with reference to FIGS. 19 through 24. As shown in FIG. 19, a first calling device 470 initiates a real time media signal 472, preferably a telephone call. Alternatively, the signal 472 is video, multimedia, a streaming application, or a combination thereof. The signal 472 is communicated to an analog-to-digital converter 482 (i.e., A/D converter 482). The A/D converter 482 converts the signal 472 to a digital signal 483. Preferably, where the signal 472 is a phone call, the digital signal 483 is a digital speech wave form.

The digital signal 483 is communicated to encoder 480. In the case of a phone call, the digital signal 483 is communicated to encoder 480 over a telephone line. The digital input 483 (preferably in Pulse Code Modulated (PCM) form) is compressed and partitioned by encoder 480 into a sequence of frames 485. The encoder 480 encodes the digital signal 483.

Preferably, in the case where the communication channel 500 is used to communicate voice, the encoder 480 is an ITU voice encoder complying with Recommendation G.723.1. Recommendation G.723.1 describes a Code Excited Linear Predictive Encoder (CELP). Recommendation G.723.1 specifies a coded representation used for compressing speech or another audio signal component of multimedia services at a low bit rate as part of the overall H.324 family of standards. Recommendation G.723.1 is entitled "DUAL RATE SPEECH ENCODER FOR MULTIMEDIA COMMUNICATIONS TRANSMITTING AT 5.3 & 6.3 KBITS/S" and is published by the Telecommunication Standardization Sector of the ITU. Recommendation G.723.1 is herein entirely incorporated by reference. Alternatively, voice encoders complying with other standards or specifications may be used.

Digital encoder input 483 is a digital speech waveform sampled at 8000 Hz, each sample represented by a signed 16 bit integer. The encoder 480, preferably the G.723.1 encoder, segments the input 483 into frames 485. Each frame is 30 milli-seconds (ms) in length. At the preferred sampling rate of 8000 Hz, 30 ms represents 240 samples.

The G.723.1 encoder can operate at two different bit rates, a low rate of 5.3 kbits/seconds or a high rate of 6.3 kbits/seconds. In the high rate setting of 6.3 kbit/s, 480 bytes (i.e., 240 samples times 2 bytes/sample) are compressed to 24 bytes. In this high rate setting, where the input 472 is voice, the encoding results in a quality that is close to toll quality. In the low rate setting of 5.3 kbits/s, 480 bytes are compressed to 20 bytes. Therefore, between the low and high rate setting, the compression ratio varies from 20 to 24.

Preferably, the encoder 480 utilizes silence detection. The G723.1 silence detection uses a special frame entitled Silence Insertion Descriptor (SID) frame. SID frame generation is described in Recommendation G723.1 which has been herein entirely incorporated by reference and to which the reader is directed to for further information. During a "silence", as that term is used herein, no voice data frames are generated by the encoder 480. An SID frame defines when a silence begins. After the encoder 80 transmits an SID frame, no further voice data frames are transmitted until the current silence ends. Updated SID frames may, however, be sent. This silencing technique reduces the required overall transfer rate. Silence detection also allows for an adjustment of the depth of the jitter buffer 517 of receiver 510. The communication channel 500 can thereby compensate for varying transportation characteristics of network 501.

Packetizer 490 packets the frames 485 into a plurality of data packets 492. Preferably, a time stamp and a sequence number is included in each data packet 492. The time stamp identifies the time a specific data packet 492 was created. The sequence number identifies data packet ordering. Data packet 492 may or may not include error correction coding. If the data packet 492 includes error correction coding, an EC encoder 491 encodes the error correction information. Data packets 492 are ordered in a data packet sequence 495 and transported by the transporting network 501 to receiver 510.

Time stamps provide a means whereby receiver 510 may evaluate certain dynamic transporting characteristics of network 501. In one aspect of the invention, certain transporting characteristics provide relevant information as to how the packetizer 490 packetizes frames 485 and how receiver 510 unpacks these frames. Alternatively, certain transporting characteristics provide relevant operating information as to whether channel 500 utilizes error correction coding.

Examples of conditional transporting characteristics include by way of example, and without limitation, such characteristics as the standard deviation of one-way data packet delay, the standard deviation of data packet round trip time, data packet jitter, and packet loss rates. The round trip time may be calculated by transporting a copy of the time stamp from the receiver 510 back to the sender 502 and comparing the received time with the timestamp value. The standard deviation of one-way delay is typically approximated by averaging the absolute value of differences between time stamp values and received times for each received packet.

Receiver 510 receives a sequence 511 of data packets 509. This sequence of data packets 511 may vary from the sequence of data packets 492 originally communicated to the transporting network 501. The variance between the two data packet sequences 495, 511 is a function of varying transporting characteristics.

Because the transporting means 501 is preferably a non-guaranteed packet switched network, receiver 510 may receive packets out of order. To combat this occurrence, sequence numbers are added to the frames 485 before the frames are packetized. As will be discussed with reference to the receiver decoder 515, the receiver 510 has buffers that store relevant data for the frames. As long as the sequence number of an arriving packet 509 is greater than the sequence number of the frame being played out, the sequence number is used to place the unpacked frame at its correct sequential position in the jitter buffer. Therefore, the larger the jitter buffer, the later a frame can arrive at the receiver 510 and still be placed in a to-be-played-out frame sequence.

It will be appreciated that the input and output media may alternatively engage in interactive communication, in which case the scenario depicted in FIG. 19 could be revised to be symmetric. In that case, for instance, the sender would also perform the functions of a receiver such as receiver 510, and receiver 510 would also perform the functions of a transmitter of real time information such as sender 502. Further, the principles described herein could be applied in either or both directions such as for an interactive telephone conversation.

Receiver 510 includes a buffer management module 513, a first set of buffers 512, a second set of buffers 514, and decoder 515. Module 513 receives incoming data packet sequence 511. Initially, module 513 strips away the packet header and reads the data packets contained in data packet stream 511. Module 513 unpacks the incoming data stream 511 and recovers the previously packed frames 485.

Packet information, such as frames 485 or packet sequence numbers, are passed to the buffer array 517. Preferably, the buffer array 517 comprises a plurality of jitter buffers. Each jitter buffer receives the packet information from the module 513. Related U.S. patent application Ser. No. 09/241,689 filed on Feb. 2, 1999 and entitled "System for Dynamic Jitter Buffer Management Based on Synchronized Clocks" describes an exemplary management system for dynamically jitter buffering data packets and is herein entirely incorporated by reference and to which the reader is directed for further details.

Module 513 reads the sequence number and the time stamp of a current frame. Redundant frames associated with the current frame have the same time stamp as the current frame since, within a given packet, redundant and current frames were both originally communicated from the packetizer 490 at approximately the same point in time. Since the order or sequence of the redundant frames is known, the redundant frame sequence numbers can be inferred from the current frame sequence number.

Preferably, each frame, together with its corresponding time stamp and sequence number, defines a node 519. Nodes 519 are forwarded to buffer array 517. Preferably, nodes 519 are forwarded to each jitter buffer of array 517. Redundant frames are discarded and not buffered if an original frame has been previously buffered. As will be discussed, jitter buffers are independently evaluated. Based on this independent evaluation, an optimal jitter buffer is selected from both the first and the second jitter buffer set 512, 514. The selected optimal jitter buffer acts as the receiver buffer, thereby passing the buffered frames to decoder 515 for playout. It is only the selected jitter buffer that forwards frames to decoder 515.

Initially, the buffer management device 513 reads an incoming data packet and may determine whether the packet contains error correction coding. If error correction coding is presently being utilized, management device 513 may utilize error correction coding and unpacks the data packets 509 and thereby recovers the frames 485.

Preferably, each frame, together with its corresponding time stamp and sequence number, defines a node 519. The nodes 519 are forwarded to buffer array 517 for buffering. Redundant frames are not buffered if an original frame has already been buffered. Buffered frames are then selectively passed on from jitter buffer array 517 to decoder 515. Decoder 515 decompresses the frames. The decompressed frames 563 are then forwarded to a digital-to-analog converter 564 (i.e., D/A converter 564) wherein the digital data 563 is converted to an analog output 565. This analog output 565 represents the original analog input 472 generated by the first calling device 470. The analog output 565 is forwarded to the second calling device 566 for play out.

By monitoring the transporting characteristics of the transporting network 501, communication channel 500 offers a number of advantages. For example, the communication channel sender and the receiver can utilize error correction coding to compensate for varying transporting dynamics and conditions of the transporting network 501. For a non-guaranteed packet switched network, the network transporting dynamics may be assessed by a packet delay distribution and a packet loss percentage, both of which generally vary over time.

In the embodiment illustrated in FIG. 19, the present transporting characteristics of the packet switched network assist in determining whether error correction coding should be utilized. This may be accomplished via the following method. Generally, a first optimal jitter buffer 521 (i.e., a non-error correction coded buffer) from the first set of jitter buffers 512 is selected. First optimal buffer 521 is selected because it results in a most preferred conditional transportational or optimal characteristics at a given time from set A 512. A second optimal jitter buffer 523 (i.e., an error correction enabled buffer) from the second set of jitter buffers 514 is also selected. Second optimal buffer 523 is selected because it results in most preferred conditional transporting characteristics at a given time from set B 514.

Buffer 521 and error correction buffer 523 are then compared with one another and one of the optimal buffers 521, 523 is then selected. This selected optimal decoder is then used to define the size of the jitter buffer 520. The selected buffer is also used to determine whether the communication channel should utilize error correction coding. If the selected buffer utilizes error correction, error correction information is then transported back to the sender 502 via a feedback packet 518. Packet 518 is transported to the senders EC encoder, 491.

Utilizing this evaluation process, receiver 510 attempts to capture conditional aspects relating to the tradeoffs involved between packet loss, bandwidth limitations, jitter buffer size, and packet delay. The embodiment also yields a practical method of choosing an ideal computational decoder among the various sets of decoders.

Another advantage of the present invention is that network traffic is minimized by selectively implementing error correction coding only during certain time intervals. These time intervals may arise when the communication channel attempts to achieve pre-selected or user-definable transporting characteristics. Accordingly, the implementation of error correction coding may be conditioned upon the transporting characteristics of the specific application, on the current state of the transporting medium, or on user definable system parameters. When dependent on the application, the choice of error correction can be made with regard to the application's sensitivity to packet loss. For example, for a data file transfer, a powerful error correction code might be used. Conversely, for a video application (which tend to be less sensitive to packet loss) a less powerful code could be used. In the case where it is desired to implement an error code based on current transporting characteristics of the medium, the gateway administrator could re-define the error code if network traffic patterns change considerably. Finally, an error code may be chosen based on a user defined parameter. For example, different error codes could define varying quality tiers with a range of performance (and cost) to the user. In the latter two cases, the transmit packets would preferably include information on the error correction code choice in the packet header, so the receiver could decode appropriately.

The choice of the jitter buffer size and the decision as to whether error correction coding is utilized is based on an evaluation of the various buffers of both jitter buffer set A 512 and set B 514. Preferably, the jitter buffer associated packet loss and delay characteristics are evaluated. Packet loss is calculated with respect to the input of decoder 515. Packet loss includes those packets delayed beyond the play-out point and those packets that are not received by the receiver (i.e., lost during transmission). Packet loss rate represents the number of lost packets divided by the total number of packets transported and represented as % $P_L$. The selection of the first and second optimal decoder 521, 523 preferably takes place as follows. With respect to first set of buffers, set A 512, the buffers having a larger buffer size and therefore compensating for the largest jitter (i.e., maximum jitter buffer size=N) are considered first. The buffers having a smaller buffer size and therefore a smaller amount of delay are subsequently considered (i.e., Buffer size=N−1, N−2, N−3, etc.). Since play out delay is proportional to the size of the jitter buffer, the jitter buffer of set A 512 having the largest delay has a buffer size equal to N.

Figure 20:
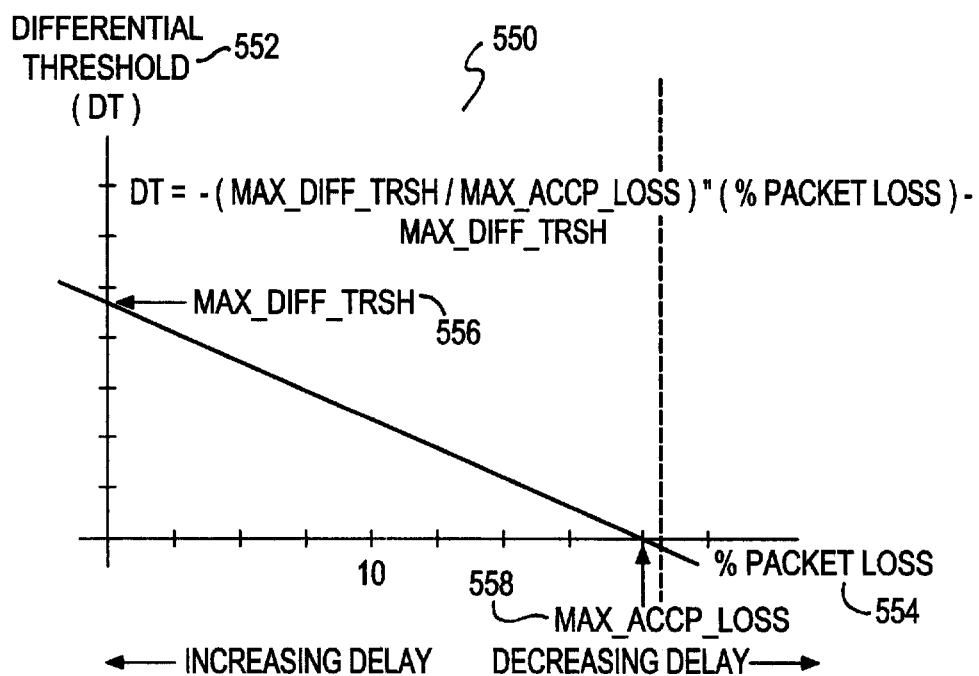
FIG. 20 provides a graphical representation for selecting an optimal jitter buffer from the jitter buffer array shown in FIG. 19.

FIG. 20 provides a graphical representation for assisting the evaluation of the buffers in set A or set B. Specifically, FIG. 20 represents a graph 550 of jitter buffer Differential Threshold (DT) 552 versus buffer Percent Packet Loss (% Packet Loss) 554. DT 552 is preferably defined by the equation:

−(MAX_DIFF_TRSH/MAX_ACCP_LOSS)*(% Packet Loss)+ (MAX_DIFF_TRSH).

The slope of the line is −(MAX_DIFF_TRSH/MAX_ACCP_LOSS). The y-intercept is MAX_DIFF_TRSH 556 and the x-intercept is MAX_ACCP_LOSS 558. In FIG. 20, this line is plotted as a function of percent packet loss.

The first step in choosing an optimal jitter buffer of a given set of jitter buffers is to begin the analysis with selecting a jitter buffer as a tentative operating point. Each jitter buffer, and therefore each operating point, defines a particular buffer size and a particular error correction status. For example, an operating point may be chosen from jitter buffer set A wherein the jitter buffer has a buffer size of N=6 packets and has an error correction status of disabled. Alternatively, an operating point may be selected from set B wherein the selected jitter buffer has a buffer size of N=8 and error correction enabled. Preferably, the choice of a tentative operating point is made such that the packet loss performance of the tentative operating point is close to the minimum possible packet loss performance, without using unnecessary delay. The concept of tentative operating point selection may be explained by way of illustration, and without limitation, via the relationship between % $P_L$ loss and packet delay for a buffer having a specific size.

Figure 21:
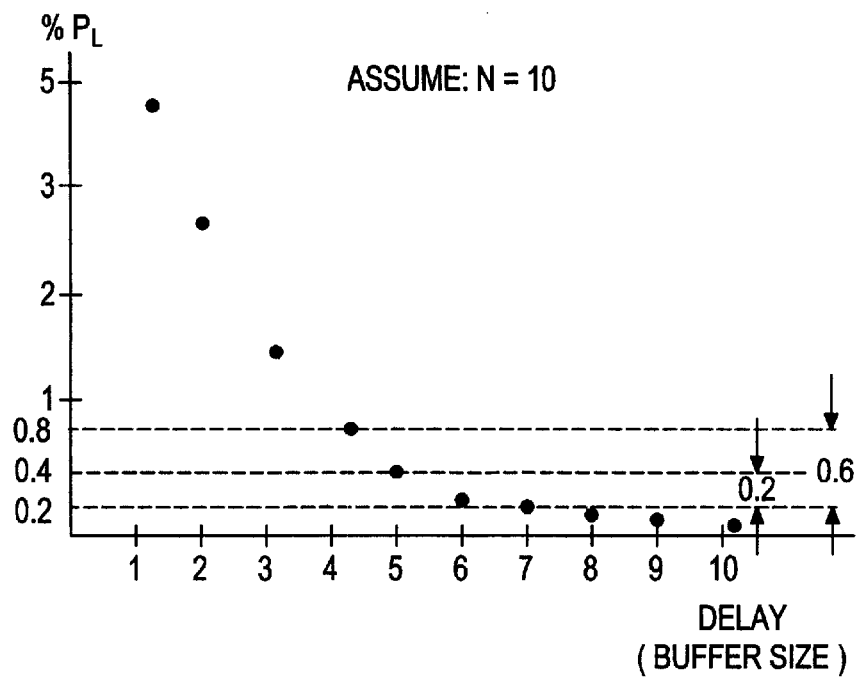
FIG. 21 illustrates a $\%P_L$ loss versus delay curve for a jitter buffer shown in FIG. 19 having a buffer size N=10.

FIG. 21 illustrates a % $P_L$ loss vs. delay (buffer size) plot for a set of jitter buffers defined by N=10. This plot demonstrates a typical relationship between loss and delay for a set of jitter buffers monotonically increasing in buffer size. The jitter buffers having a smaller buffer size (i.e., those less than N=10) will have an incrementally larger loss probability. For example, a buffer of N =1 may have a % $P_L$ of approximately 5%. As buffer size increases, the loss probability decreases until a buffer size is reached such that the loss probability can no longer improve significantly vis-a-vis a smaller buffer. Hence, there will exist a point of diminishing returns with respect to packet loss probability as a function of buffer size For example, as shown in FIG. 21, a buffer of N=10 may have a % $P_L$ of approximately 0.2%. Preferably, the tentative operating point is chosen such that the buffer size is as close to this point of diminishing returns as possible.

An algorithm that realizes this interrelationship between the buffer size and loss probability may now be described. Consider the applicable subset of jitter buffers (i.e.—each subset has error correction either enabled or disabled). The jitter buffers range from largest delay to smallest delay. As one moves along the delay (X) vs. % $P_L$ (Y) curve in the direction of decreasing delay, a first buffer may be identified as having a % $P_L$ that exceeds a % $P_L$ obtained by the largest delay buffer by some arbitrary value, for example, 0.05. The value 0.05 is arbitrary, and is generally chosen to initiate a determination of a first significant deviation from the minimal packet loss performance.

A buffer resulting in a delay one packet larger than this arbitrary value is identified as the tentative operating point. If such an operating point does not exist, the minimum delay buffer may be chosen as the tentative operating point. This latter case may be true if all jitter buffers within a given set have a packet loss performance within 0.05 percent of one another. In such a case, the minimal delay buffer would have minimal (or near minimal) packet loss performance as well as a correspondingly small delay. In the example illustrated in FIG. 21, a buffer size of N=6 would therefore be chosen.

During certain transporting network operating conditions, the minimum percent packet loss realized by all buffers of a given set may exceed a user definable variable. As shown in FIG. 20, this system variable may be defined as the maximum acceptable packet loss (i.e., MAX_ACCP_LOSS). MAX_ACCP_LOSS defines the maximum acceptable packet loss for the application being played out.

Once the tentative operating point is selected from jitter buffer sets A 512 and B 514 (FIG. 19), consideration is made as to whether either the set A or the set B tentative operating point will be the final operating point and therefore define the optimal buffer for that given set. This process is completed independently for sets A and B and the process of determining the optimal buffer and therefore operating point in set A or set B is essentially identical.

First, if the minimum percent packet loss realized by all jitter buffers in a given set exceeds MAX_ACCP_LOSS, then the tentative operating point becomes the final operating point. The buffer defining the final operating part is therefore the optimal buffer of that set. If this criterion is not satisfied, the concept of differential threshold (DT) is used to determine the optimal jitter buffer. FIG. 20 provides a graphical representation for determining DT. For any buffer realization, the corresponding loss rate may be found along the X-axis of FIG. 20. Once this loss rate is found, the corresponding DT may be computed via the linear plot in this figure. The differential threshold, therefore, is a function of the packet loss rate.

Figure 22:
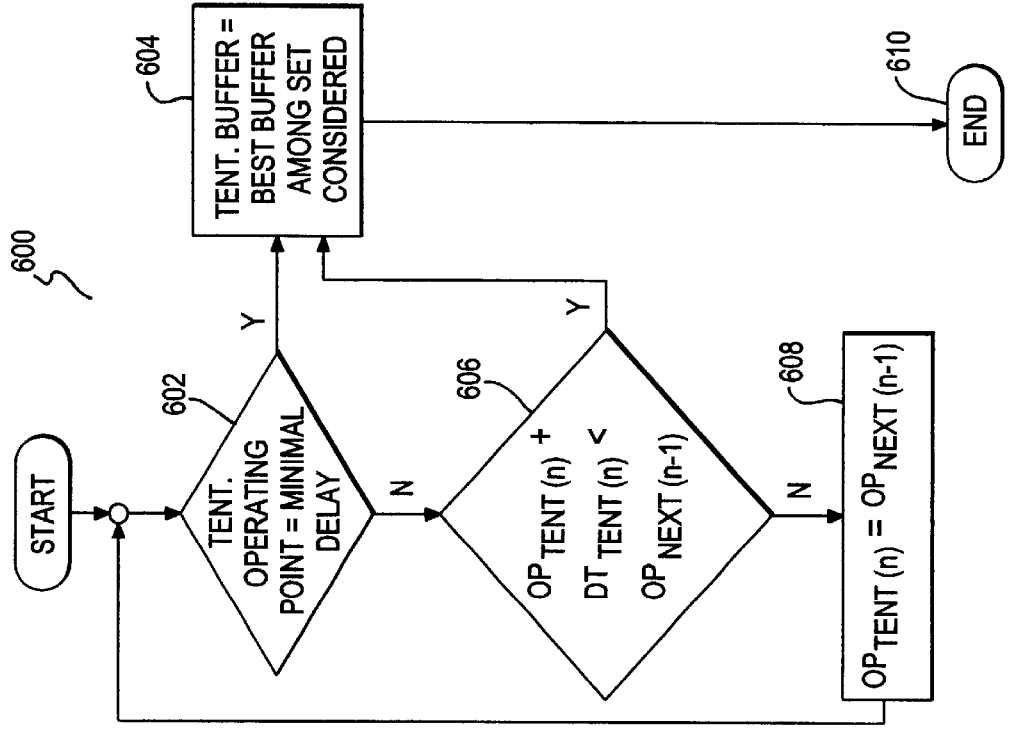
FIG. 22 provides a flowchart for selecting an optimal jitter buffer in a jitter buffer array shown in FIG. 19.

FIG. 22 provides a flowchart 600 illustrating how the concept of differential threshold is used to determine an optimal decoder. At step 602, a check is made to determine if the tentative operating point results in a minimum buffer delay. If the tentative operating point results in the minimum buffer delay, the system proceeds to step 604, and the tentative operating point becomes the optimal buffer for the jitter buffer set. Otherwise, if the tentative operating point does not result in the minimal delay, at step 606, the performance of the tentative operating point with loss rate $OP_{tent(n)}$ is compared to the loss rate performance of the buffer having a buffer size which is one packet smaller: $OP_{next(n-1)}$. At step 606, $DT_{tent(n)}$ is defined as the differential threshold of the loss rate performance realized by the buffer associated with the tentative operating point. The differential threshold may be generally considered as essentially a penalty term. $OP_{tent(n)} \leq OP_{next(n-1)}$ will generally be true since the tentative operating point of a buffer of size N will result in a greater delay than a buffer of size N−1.

It is preferably required that the performance of the tentative operating point be superior by the amount specified by the differential threshold in order to accept the tentative operating point as the true operating point for a given set of jitter buffers. If this is not true, at step 608, the tentative operating point, $OP_{tent(n)}$, is redefined to be the buffer having a buffer size one packet smaller $OP_{next(n-1)}$ and the system returns to step 602. At step 602, this process continues until the performance comparison in step 606 is true, or until the tentative buffer is the minimum delay buffer within the given jitter buffer set.

Figure 23:
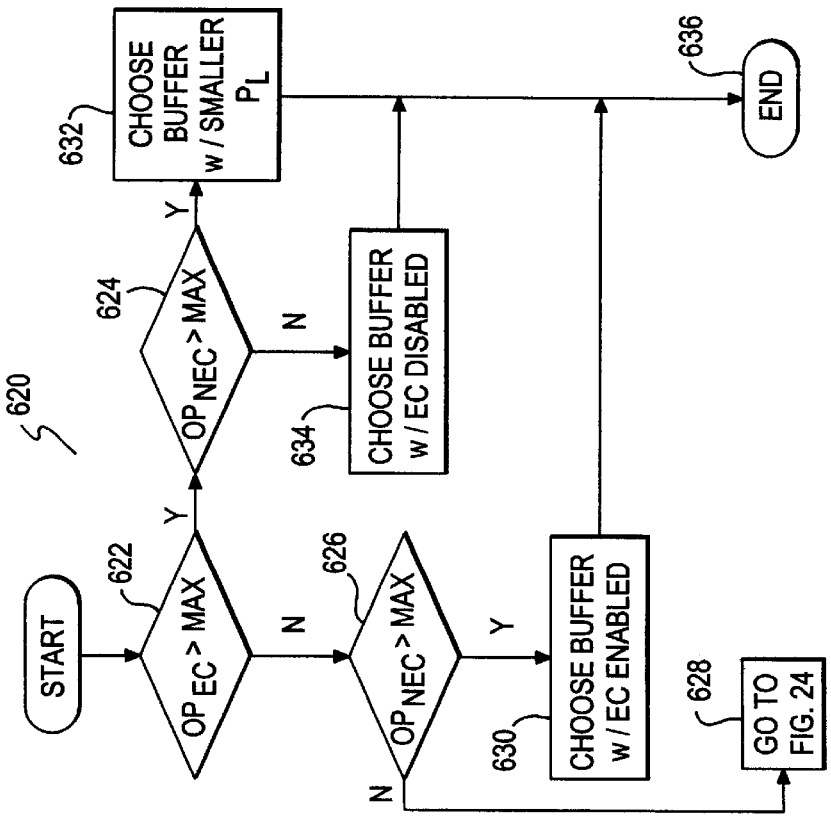
FIG. 23 provides a flowchart for selecting either the first or the second optimal jitter buffers selected from the flowchart provided in FIG. 22.

FIG. 23 illustrates an exemplary flowchart 620 for choosing the jitter buffer size and the error correction coding status of the communication channel shown in FIG. 19. Specifically, flowchart 620 illustrates a flowchart for determining whether the first or the second optimal jitter buffer is selected for forwarding the buffer frame for subsequent playout. By selecting a first optimal jitter buffer without error correction coding (from set A) and a second optimal jitter buffer with error correction coding (from set B), two possible communication channel operating points are possible. In addition, different jitter buffer sizes are also possible.

In FIG. 23, $OP_{EC}$ denotes the percent packet loss for the optimal jitter buffer with error correction and $OP_{NEC}$ denotes the percent packet loss of the optimal jitter buffer without error correction. Flowchart 620 provides a process for evaluating the various possibilities when comparing the percent packet loss for the first and second optimal jitter buffers. Table 1 below summarizes the various possibilities of the percent packet loss of the first and second optimal jitter buffers.

TABLE 1

Figure 24:
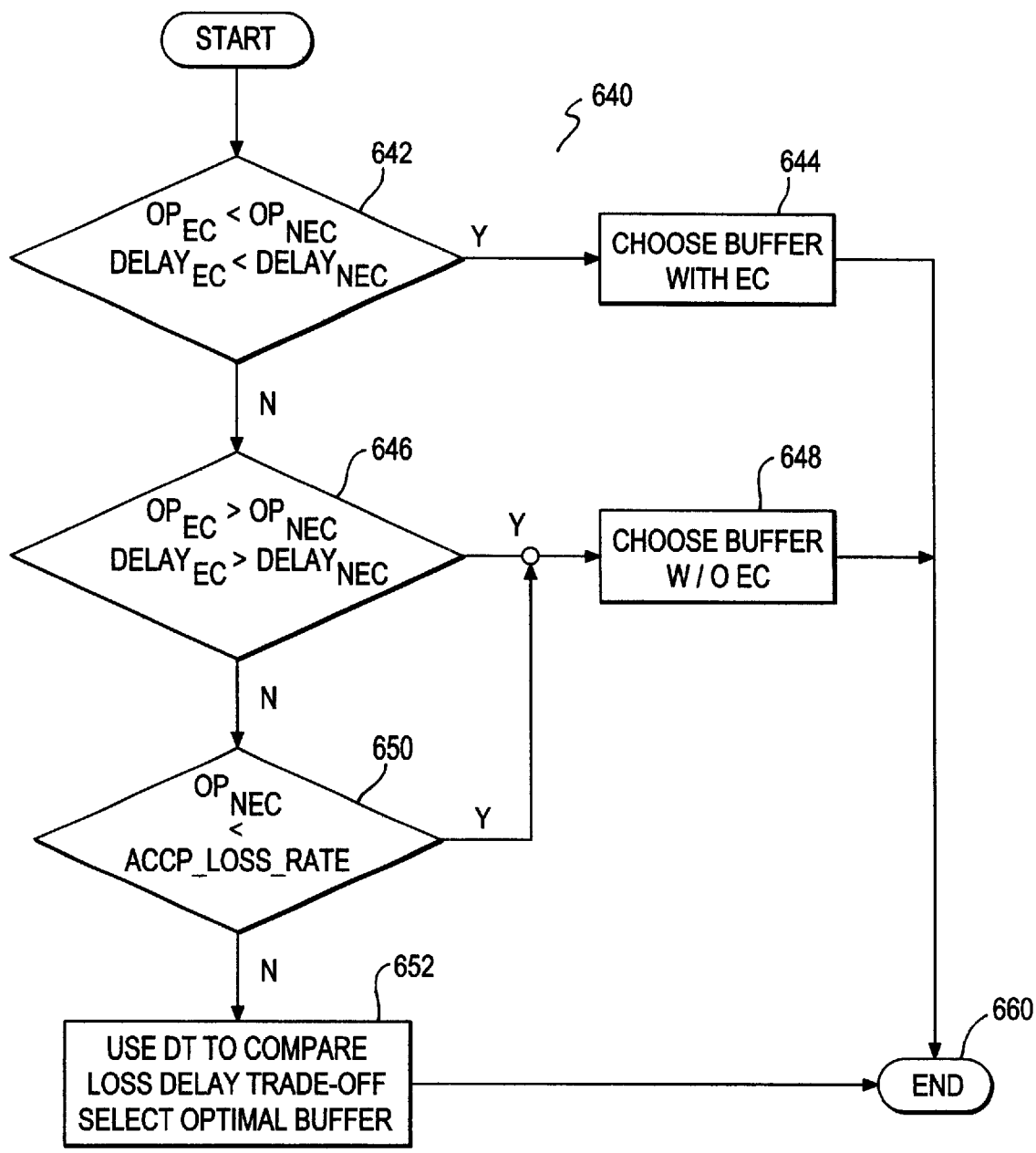
FIG. 24 provides an additional flowchart for selecting either the first or second optimal jitter buffer selected from the flowchart provided in FIG. 22.

| Cases | Preferred Action |
| --- | --- |
| $OP_{EC} >$ MAX_ACCP_LOSS and $O_{NEC} >$ MAX_ACCP_LOSS | Jitter buffer with smaller packet loss probability is chosen. |
| $OP_{EC} >$ MAX_ACCP_LOSS and $OP_{NEC} \leq$ MAX_ACCP_LOSS | Jitter buffer with error correction disabled is Chosen. |
| $OP_{EC} \leq$ MAX_ACCP_LOSS and $OP_{NEC} >$ MAX_ACCP_LOSS | Jitter buffer with error correction enabled is Chosen. |
| $OP_{EC} \leq$ MAX_ACCP_LOSS and $OP_{NEC} \leq$ MAX_ACCP_LOSS | See flowchart of FIG. 24 |

As identified in Table 1, four cases guide evaluating the first or the second optimal jitter buffer. FIG. 23 illustrates a flowchart 620 for the first three cases identified in Table 1.

Referring to flowchart 620, at step 622, $OP_{EC}$ is compared to MAX_ACCP_LOSS. If $OP_{EC}$ is greater than MAX_ACCP_LOSS, the system proceeds to step 624. At step 624, $OP_{NEC}$ is compared to MAX_ACCP_LOSS. If $OP_{NEC}$ is greater than MAX_ACCP_LOSS, the jitter buffer with the smaller packet loss probability is selected at step 632 and the selection process is concluded 636. If at step 624, $OP_{NEC}$ is not greater than MAX_ACCP_LOSS, then the jitter buffer without error correction is chosen at step 634. Step 634 corresponds to the second case summarized in Table 1.

In the third case, and referring to step 622, the operating point performance $OP_{EC}$ is less than MAX_ACCP_LOSS. At step 626, if the operating point $OP_{NEC}$ is determined to be greater than MAX_ACCP_LOSS, the jitter buffer having error correction is selected at step 630. If $OP_{NEC}$ is less than or equal to MAX_ACCP_LOSS, the evaluation process proceeds to step 628. Step 628 is the fourth case summarized in Table 1. FIG. 24 provides a flowchart 640 for the fourth case where both $OP_{NEC}$ and $OP_{EC}$ are less than or equal to MAX_ACCP_LOSS.

In FIG. 24, at step 642, the percent packet loss and delay of the optimal jitter buffers are compared. At step 642, the packet loss $\{OP_{NEC}, OP_{EC}\}$ and the delay $\{Delay_{NEC}, Delay_{EC}\}$ for both optimal jitter buffers are compared. Step 642 tests if the packet loss and delay for the jitter buffer with error correction are both less than the error correction disabled jitter buffer packet loss ($OP_{NEC}$) and delay ($Delay_{NEC}$) for the decoder without error correction. If the loss and delay are both lower for the system with error correction, the operating point with error correction is selected at step 644 as the preferred jitter buffer. The search for the preferred jitter buffer is then concluded at step 660. If the condition at comparison step 642 is not true, the analysis proceeds to step 646.

At step 646, the percent packet loss and the delay of the optimal jitter buffers from sets A and B again are compared. If the loss and delay are both lower for the system without error correction, the operating point without error correction is selected at step 648 as the preferred jitter buffer. The search for the preferred jitter buffer is then concluded at step 660. If the condition at step 646 is not true, the process proceeds to step 650.

At step 650, the percent packet loss corresponding to the jitter buffer without error correction is compared to the ACCP_LOSS_RATE. If ACCP_LOSS_RATE is greater than the percent loss, the process proceeds to step 648 where the jitter buffer without error correction is chosen as the preferred jitter buffer. The search is concluded at step 660.

If, however, $OP_{NEC}$ is greater or equal to ACCP_LOSS_RATE, the system proceeds to step 652, where the differential threshold (DT) is used to compare the loss/delay trade-offs of the two optimal jitter buffers.

At step 652, a tentative operating point is preferably chosen as the jitter buffer having the smaller packet loss rate. At this tentative operating point, two cases may result:

In the first case, the operating point of the error correction coded optimal jitter buffer is less than the operating point of the optimal jitter buffer without error correction coding. (i.e., $OP_{EC}<OP_{NEC}$). If $OP_{EC}<OP_{NEC}$ and $OP_{EC}+|$difference in buffer size$|*$ DT (buffer with EC)$<OP_{NEC}$, the jitter buffer with error correction is chosen. Otherwise, the system without error correction is chosen.

In the second case, the operating point of the error correction coded jitter buffer is greater than the operating point of the optimal jitter buffer without error correction coding. (i.e., $OP_{NEC}<OP_{EC}$) If $OP_{NEC}<OP_{EC}$ and $OP_{NEC}+|$difference in buffer size$|*$ DT (buffer without EC)$<OP_{EC}$, the jitter buffer without error correction is chosen. Otherwise, the system with error correction is chosen.

Once a preferred buffer is selected, the error correction coding information of the buffer may be transported back to the sender. Preferably, this information is transported via a feedback packet 518 (FIG. 19) from management device 513.

Although the foregoing description of the preferred embodiment will enable a person of ordinary skill in the art to make and use the invention, a detailed C++ language program is included below. The program is an implementation of a jitter buffer size and error correction coding selection for a receiver of the Internet telephony scheme. Additional detailed features of the system will be come apparent to those skilled in the art from reviewing these programs.

```cpp
// Written by James Kroll
// 3Com corp.
// 1800 W. Central Road
// Mount Prospect IL 60056
// 1/22/99
#include <icstream.h>
#include <math.h>
const float MAX_DIFF_TRSH=0.7;  //defines the Y-intercept of the DT curve
const float MAX_ACCP_LOSS=1.4;  // defines largest loss which is OK and the
const float DT_SLOPE=MAX_DIFF_TRSH/MAX_ACCP_LOSS;
                                // (-)slope of differential threshold curve
                                // NOTE: DT_slope >= 1.0 is invalid
const float ACCP_LOSS=0.6;      // for the no Ec case (NEC), defines loss
                                // (in percent) which is good enough
                                // i.e. - EC will not be necessary
                                // at this loss rate
const in MAX_DATA_LENGTH=50;            // max # of different buffer sizes supported
struct perf_data                // structure to hold loss/buffer data pts
    {
    float   perc_loss;
    int     buff_size;
    };
int choose_system(perf_data*, int, perf_data*,int,int*,int*);
        //NEC_data, # pts NEC, EC_data, # pts EC, EC_on, opt_size
        //return 1 if result OK, else returns 0
int main( )
    {
    // The main portion of this program accepts two vectors (of arbitary
    // length) of performance data. One vector for the buffers w/EC, and one
    // wo/EC. The elements of each vector are the loss rate (in percent
    // packet loss) and the buffers watermark setting (½ the total buffer
    // size in number of packets). The main program can be used to test the
    // execution of the routine "choose_system( )". The main program can
    // also be used to test different values of the parameters set via const
    // floats defined above, to check for (and define) a reasonable loss/delay
    // trade-off for the application in question.
    perf_data   NEC_data[MAX_DATA_LENGTH];//vector of structures for data wo/EC
    perf_data   EC_data[MAX_DATA_LENGTH];//vector of structures for data w/EC
    int     EC_on;              //if EC, EC_on=1 else EC_on=0;
    int     cpt_size;           //hold-optimal buff_size in # packets
    int     num_pts_NEC, num_pts_EC;    //#data points actually in the vectors
    int     i;          //loop counter
    int     result_OK;      //holds return of choose_system( ).
cout<<"\n\Enter the value of num_pts_NEC and num_pts_EC;";
cin>>num_pts_NEC>>num_pts_EC;
cout<<"\n\n\n";
cout<<"Enter perf data for no EC case, smallest to largest buff_sizes\n\n";
for(i=0; l<num_pts_NEC;i++)
        {
        cout<<"Enter 2 element data point "<<j<<"as: perc_loss buff_size";
        cin>>NEC_data[i].perc_loss>>NEC_data[i].buff_size;
        }
    cout<<"\n\n\n";
    cout<<"Enter perf data for EC case, smallest to largest buff_sizes\n\n";
    for (i=0, l<num_pts_EC; i++)
        {
        cout<<"Enter 2 element data point "<<i <<" as: perc_loss buff_size";
        cin>>EC_data[i].perc_loss>>EC_data[i].buff_size;
        }
    result_OK=choose_system(NEC_data, num_pts_NEC, EC_data, num_pts_EC,
                                    &EC_on, &opt_size);
    if(result_OK)
        {
        cout<<"\n\n\nRESULTS FOLLOW\n"
            <<"\n **** EC_on="<<EC_on <<" and opt_size="<<opt_size<<"****";
        }
    return 0;
    }
int choose_system(perf_data *NEC, int num_pts_NEC,
                  perf_data *EC, int num_pts_EC,
                        int *EC_on, int *opt_size)
    // This routine realizes an algorithm described in this disclosure, to
    // find an optimal buffer size and error coding state, via comparisons
    // of delay and performance of the viable buffer/FEC choices, as well as
    // calculation and use of the differential threshold
    {
    int     l,k;                //loop counters
    int     tent_index;
    int             index_NEC,index_EC;
```

```
        int     buff_size_diff;
        float   diff_thresh;
        perf_data * data_ptr;
        //*** Step 1, try to find a decoder wo/EC having acceptable performance ***
        // i.e.: find decoder with loss < ACCP_LOSS_RATE
        i=0;
        while(i<num_pts_NEC)
            {
            if( NEC[i].perc_loss < ACCP_LOSS )
                {
                *EC_on=0;
                *opt_size=NEC[i].buff_size;
                return(1);
                }
            i++;
            }
// *** Next, implement the loop to calculate the best decoder wo/ & w/EC
for(k=0; k<=1; k++)
    {
    //**** Step 2: find the initial tentative operating point ****
    //
    // this presumes a monotonically decreasing loss/delay curve.
    // but even if that's not true, it's OK because the lower loss point
    // will be found once we consider points with lower delay.
    if(k==0)
        {tent_index=num_pts_NEC-1; data_ptr=NEC;}
    else
        {tent_index=num_pts_EC-1; data_ptr=EC;}
    if(tent_index <= -1) //implies orig num_pts was 0 or less, no good!
        {cout<<"\n\n *** ERROR, NUM_PTS TOO SMALL *** ";return(0);}
    else if(tent_index == 0) //implies orig num_pts=1!
        tent_index=0;        //hence best pt. in index 0;
    else //this will be the usual case, such that num_pts >=2
        {
        while(tent_index > 0)
            {
            if( fabs( data_ptr[tent_index-1].perc_loss -
                            data_ptr[tent_index].perc_loss) > 0.05)
                //these data points considered to have different perf
                {
                break; //break from while loop
                }
            tent_index-;
            }
        //NOTE: if tent_index=0 is reached, this means all pts behave the same
        }
// *** and the if/else if/else block, tent_index now holds tent op pt ***
if(tent_index==0) //differential threshold calculation block not req
    goto end_loop;
    //**** Step 3: use the diff. threshold to determine the optimal decoder
    //          for this case (EC either off or on)
    //1st determine if none of the decoders are acceptable
    //this processing assumes a monotonic loss/delay function
    if( data_ptr[tent_index].perc_loss > MAX_ACCP_LOSS)
        goto end_loop;
    //2nd, loop through differential threshold calculations
    while( tent_index > 0)
        {
        diff_thresh=DT_SLOPE*(MAX_ACCP_LOSS-data_ptr[tent_index].perc_loss);
        if( (data_ptr[tent_index].perc_loss + diff_thresh) <
                            data_ptr[tent_index-1].perc_loss)
            {
            break; //break from while loop, optimal index found!
            }
        tent_index==;
        }
    //******************* End Step #3 ***********************
end_loop;
    if(k==0)
        index_NEC=tent_index;
    else
        index_EC=tent_index;
    }
//cout<<"\n\nindex_NEC="<<index_NEC<<" and index_EC="<<index_EC;
//**** Step 4: determine whether or not we use the EC optimized decoder
//          or the NEC optimized decoder
// *** test the first three possible conditions ***
if(EC[index_EC].perc_loss > MAX_ACCP_LOSS)
    {
```

-continued

```
    if(NEC[index_NEC].perc_loss > MAX_ACCP_LOSS)//chooses sys-smaller DPLR
        {
        if(NEC[index_NEC].perc_loss <= EC[index_EC].perc_loss)
            {
            *EC_on=0;
            *opt_size=NEC[index_NEC].buff_size;
            }
        else
            {
            "EC_on=1;
            *opt_size=EC[index_EC].buff_size;
            }
        }
    }
else //choose decoder w/EC disabled (pathological case)
    {
    *EC_on=0;
        *opt_size=NEC[index_NEC].buff_size;
            }
        }
    else // if we get here, perf w/EC <= MAX_ACCP_LOSS
        {
        if(NEC[index_NEC].perc_loss > MAX_ACCP_LOSS)
            {
            *EC_on=1;
            *opt_size=EC[index_EC].buff_size;
            }
    else //perf of both is OK, use 3 other criterion to choose winner
        {
        if( (NEC[index_NEC].perc_loss <= EC[index_EC].perc_loss) &&
                (NEC[index_NEC].buff_size <= EC[index_EC].buff_size))
            {
            *EC_on=0;
            *opt_sizeNEC[index_NEC].buff_size;
            }
        else if( (EC[index_EC].perc_loss < NEC[index_NEC].perc_loss) &&
                    (EC[index_EC].buff_size < NEC(index_NEC].buff_size))
            {
            *EC_on=1;
            *opt_size=EC[index_EC].buff_size;
            }
    else //apply the diff threshold to make the final decison
                {
                if(EC[indec_EC].perc_loss < NED[index_NEC].perc_loss)
                //EC decoder is in the tent op. pt., and EC_buff>= NEC_buff
                {
                buff_size_diff=EC[index_EC].buff_size-NEC[index_NEC].buff_size;
                diff_thresh=DT_SLOPE*(MAX_ACCP_LOSS-EC[index_EC].perc_loss);
                if( (EC[indec_EC].perc_loss
                            + buff_size_diff*diff_thresh) <
                                        NEC[index_NEC].perc_loss)
                    {
                    *EC_on=1;
                    *opt_size=EC[index_EC].buff_size;
                    }
                else
                    {
                    *EC_on=0;
                    *opt_size=NEC[index_NEC].buff_size;
                    }
                }
        else //NEC decoder is the tent op pt., and NEC_buff > EC_buff
            {
            buff_size_diff=NEC[index_NEC]buff.size-EC[index_EC].buff_size;
            diff_thresh=DT_SLOPE*(MAX_ACCP_LOSS-NEC[index_NEC].perc_loss);
            if( (NEC[index_NEC].perc_loss
                            + buff_size_diff*diff_thresh) <
                                        EC[index_EC].perc_loss)
                        {
                        *EC_on=0;
                        *opt_size=NEC[index_NEC].buff_size;
                        }
                    else
                        {
                        *EC_on=1;
                        *opt_size=EC[index_EC].buff_size;
```

```
            }
          }
        }
      }
    }
  }
return(1);
}
```

While the invention has been described in conjunction with presently preferred embodiments of the invention, persons of skill in the art will appreciate that variations may be made without departure from the scope and spirit of the invention. This true scope and spirit is defined by the appended claims, as interpreted in light of the foregoing.

We claim:

1. An apparatus for buffering a real time input communicated over a transporting network comprising, in combination:
   a receiving device receiving the transported real time input, the receiving device comprising a first set of jitter buffers, and a second set of jitter buffers utilizing error correcting;
   a first plurality of buffers maintained in the first set of jitter buffers;
   a second plurality of buffers maintained in the second set of jitter buffers;
   a means for comparing the first plurality of buffers and the second plurality of buffers;
   a means for selecting a first optimal buffer from the first plurality of buffers; and
   a means for selecting a second optimal buffer from the second plurality of buffers,
   wherein either the first or the second selected optimal decoder determines the receiver buffer size and whether forward error correction is utilized.

2. A method for real time communication system buffer selection, the method comprising the steps of:
   receiving a stream of transported data packets by a real time receiver, the receiver comprising a buffer management device, a first plurality of jitter buffers, and a second plurality jitter buffers;
   evaluating the first plurality of jitter buffers;
   choosing a first optimal jitter buffer from the first plurality of jitter buffers, the first optimal jitter buffer having an associated conditional first optimal jitter buffer performance characteristic;
   evaluating the second plurality of jitter buffers;
   choosing a second optimal jitter buffer from the second plurality of jitter buffers, the second optimal jitter buffer having an associated conditional second optimal jitter buffer performance characteristic;
   comparing the associated conditional characteristics of the first optimal jitter buffer and the second optimal jitter buffer; and
   selecting either the first optimal jitter buffer or the second optimal jitter buffer as a preferred buffer of the receiver.

3. The method of claim 2 wherein either the first or the second plurality of jitter buffers utilize error correction coding.

4. The method of claim 1 further comprising the steps of packetizing data frames into data packets at a sending device, some of the data packets containing error correction coding information; and
   adjusting the error correction coding information according to the selected optimal decoder.

5. The method of claim 2 further comprising the step of encoding a real time input at a sending device according to a dynamic transporting characteristic of a transporting network.

6. The method of claim 5, further comprising the steps of packetizing an error correction coding parameter into a feedback packet at the receiver, and
   transporting the feedback packet to the sending device over a transporting network.

7. The method of claim 2 further comprising the step of forwarding a stream of buffered data packets from the preferred buffer to a decoder; and
   forwarding the data frames from the decoder to a calling device for play out of the forwarded data packets.

8. The method of claim 2 wherein the real time input is an audio waveform.

9. The method of claim 2 wherein the real time input is a video waveform.

10. The method of claim 2 wherein the preferred buffer is selected periodically.

11. A method for transporting an interactive real time media input over a packet network comprising the steps of:
    partitioning and compressing the real time media input into a plurality of frames at a digital waveform encoder;
    packetizing the frames into a plurality of data packets, some of the data packets packetized having error correction coding information;
    transporting the data packets from the digital encoder to a receiver;
    unpacking the data packets into the plurality of frames;
    arranging packet information associated with the plurality of frames within each jitter buffer of a first array of jitter buffers and each jitter buffer of a second array of jitter buffers; evaluating the first array of jitter buffers and the second array of jitter buffers according to a dynamic transporting characteristic of the network;
    selecting a preferred jitter buffer from either the first or the second array of jitter buffers, the preferred jitter buffer having a jitter buffer length parameter.

12. The method of claim 11, further comprising the step of forwarding the unpacked frames from the preferred jitter buffer to a digital waveform decoder.

13. The method of claim 12, further comprising the step of deciding which data packets will contain the error correction coding information based on the dynamic transporting characteristic.

14. The method of claim 12, further comprising the step of playing out the media input.

15. The method of claim 11, further comprising the step of selecting the dynamic characteristic from a group consisting of data packet loss, data packet delay, packet burst loss, loss auto-correlation and delay variation.

16. The method of claim 13, wherein the network comprises a packet switched network.

17. The method of claim 14, wherein the network comprises an interconnected switched network of Local Area Networks, Internet Protocol Networks, frame relay networks, ATM networks, and Wide Area Networks.

18. The method of claim 11, wherein the packet information associated with the plurality of frames is a packet sequence number.

* * * * *